US012587717B2

(12) United States Patent
Meier et al.

(10) Patent No.: US 12,587,717 B2
(45) Date of Patent: Mar. 24, 2026

(54) FACILITATING VIDEO GENERATION

(71) Applicant: 10Z, LLC, San Diego, CA (US)

(72) Inventors: Philip Martin Meier, San Diego, CA (US); Csaba Matyas Petre, San Diego, CA (US)

(73) Assignee: 10Z, LLC., San Diego, CA (US)

( * ) Notice: Subject to any disclaimer, the term of this patent is extended or adjusted under 35 U.S.C. 154(b) by 0 days.

(21) Appl. No.: 18/668,847

(22) Filed: May 20, 2024

(65) Prior Publication Data

US 2024/0314406 A1 Sep. 19, 2024

Related U.S. Application Data

(63) Continuation of application No. PCT/US2022/051101, filed on Nov. 28, 2022.

(60) Provisional application No. 63/281,700, filed on Nov. 21, 2021, provisional application No. 63/319,303, filed on Mar. 12, 2022.

(51) Int. Cl.
| | |
|---|---|
| *H04N 21/81* | (2011.01) |
| *H04N 21/234* | (2011.01) |
| *H04N 21/431* | (2011.01) |
| *H04N 21/845* | (2011.01) |

(52) U.S. Cl.
CPC ..... *H04N 21/816* (2013.01); *H04N 21/23418* (2013.01); *H04N 21/23424* (2013.01); *H04N 21/4318* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 9,992,556 | B1 * | 6/2018 | Price | H04N 21/4302 |
| 10,771,867 | B1 * | 9/2020 | Chemolosov | G06F 16/739 |
| 2019/0130192 | A1 * | 5/2019 | Kauffmann | G11B 27/031 |
| 2019/0370554 | A1 * | 12/2019 | Meier | H04N 21/6582 |
| 2021/0304468 | A1 * | 9/2021 | Doggett | G11B 27/031 |
| 2021/0390317 | A1 * | 12/2021 | Kim | H04N 21/4662 |
| 2025/0203178 | A1 * | 6/2025 | Mishra | G06V 20/49 |

FOREIGN PATENT DOCUMENTS

EP 2044591 B1 9/2014

OTHER PUBLICATIONS

Apostolidis, E. et al. "Video Summarization Using Deep Neural Networks: A Survey", Proceedings of the IEEE, vol. 109, No. 11, Nov. 2, 2021.

(Continued)

*Primary Examiner* — Alexander Q Huerta
(74) *Attorney, Agent, or Firm* — Mughal Gaudry & Franklin PC

(57) ABSTRACT

Features described herein generally relate to content production. Particularly, the present disclosure relates to facilitating video generation. Using machine-learning models, a storyboard can be generated from an inspirational video, video attributes can be determined for the storyboard, editing scores and actions can be determined for candidate videos, candidate videos can be edited based on the editing scores and actions, and the edited candidate videos can be combined to generate a video.

20 Claims, 13 Drawing Sheets

(56)     References Cited

OTHER PUBLICATIONS

International Search Report and Written Opinion for PCT Patent Application No. PCT/US2022/051101, dated Feb. 24, 2023.
Sah, S et al., "Semantic Text Summarization of Long Videos", 2017 IEEE Winter Conference on Applications of Computer Vision, Mar. 2017.

* cited by examiner

1300

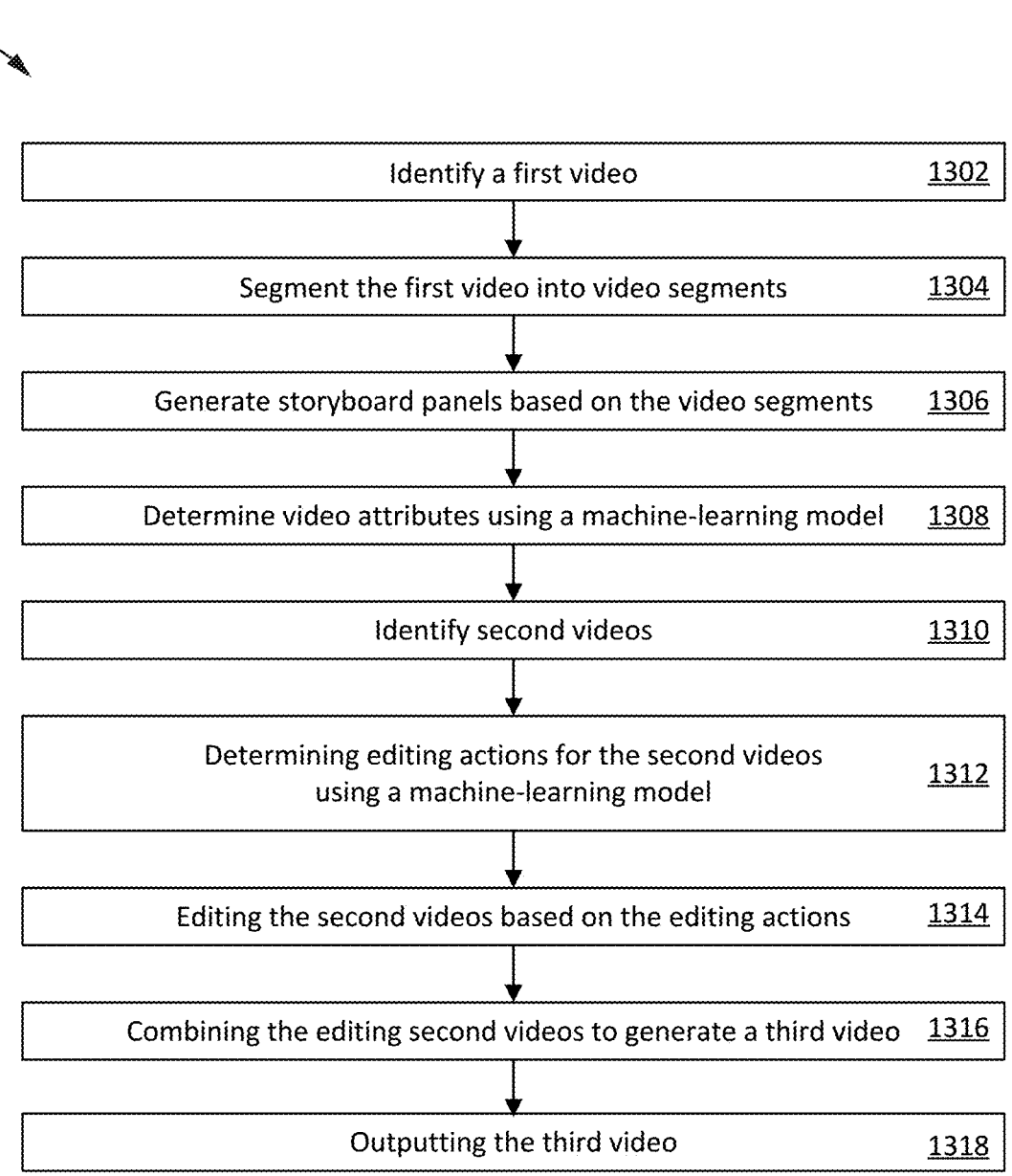

| Identify a first video | 1302 |

| Segment the first video into video segments | 1304 |

| Generate storyboard panels based on the video segments | 1306 |

| Determine video attributes using a machine-learning model | 1308 |

| Identify second videos | 1310 |

| Determining editing actions for the second videos using a machine-learning model | 1312 |

| Editing the second videos based on the editing actions | 1314 |

| Combining the editing second videos to generate a third video | 1316 |

| Outputting the third video | 1318 |

FIG. 13

FACILITATING VIDEO GENERATION

CROSS-REFERENCE TO RELATED APPLICATIONS

The present application is a Continuation application of PCT Patent Application No. PCT/US2022/051101, filed on Nov. 28, 2022, which claims benefit of both of U.S. Provisional Application No. 63/281,700 having a filing date of Nov. 21, 2021, and U.S. Provisional Application No. 63/319, 303 having a filing date of Mar. 12, 2022, which are both incorporated by reference herein in their entireties for all purposes.

FIELD

The present disclosure generally relates to content production. Particularly, the present disclosure relates to facilitating video generation.

BACKGROUND

With the prevalence of social media and other widely available means for publishing content, content creation has become increasingly popular and essentially a part of the fabric of society. Humans create content to communicate and share experiences with each other and wider audiences. Often content is produced by multiple individuals and/or in teams with different equipment and content production tools. However, these content production tools are limited in their capacity to facilitate workflow between these tools and human content creators.

SUMMARY

Embodiments described herein pertain to facilitating video generation.

According to some embodiments, a method for facilitating video generation includes identifying a first video; segmenting the first video into a plurality of video segments; automatically generating a plurality of storyboard panels based on the plurality of video segments using a machine-learning model, each storyboard panel of the plurality of storyboard panels representing at least one video segment of the plurality of video segments; automatically determining a plurality of video attributes by processing each video segment of the plurality of video segments, each video attribute of the plurality of video attributes corresponding to a storyboard panel of the plurality of storyboard panels; identifying a plurality of second videos, each second video of the plurality of second videos corresponding to at least one video attribute of the plurality of video attributes; combining the second videos to generate a third video; and outputting the third video.

Each storyboard panel of the plurality of storyboard panels includes a textual label describing at least one of content depicted in a video segment of the plurality of video segments and a video attribute of the plurality of video attributes. The plurality of video attributes is automatically determined using a machine-learning model.

The method further includes determining a plurality of editing scores for the plurality of second videos by processing the plurality of second videos using a machine-learning model and editing the plurality of second videos based on the plurality of editing scores and determining a plurality of editing actions for the plurality of second videos by processing the plurality of second videos using a machine-learning model; and editing the plurality of second videos based on the plurality of editing actions. The machine-learning model used to determine the plurality of editing scores and the machine-learning model used to determine the plurality of editing actions includes an encoder and decoder, a computational fabric, or a combination thereof.

According to some embodiments, a system for facilitating video generation includes one or more processors and one or more memories, where the one or more memories store instructions which, when executed by the one or more processors, cause the one or more processors to perform part or all of the operations and/or methods disclosed herein.

Some embodiments of the present disclosure also include one or more non-transitory computer-readable media storing computer-readable instructions that, when executed by one or more processors, cause the one or more processors to perform part or all of the operations and/or the methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 13 illustrates an example of a process for facilitating video generation according to some aspects of the present disclosure.

DETAILED DESCRIPTION

Figure 1:
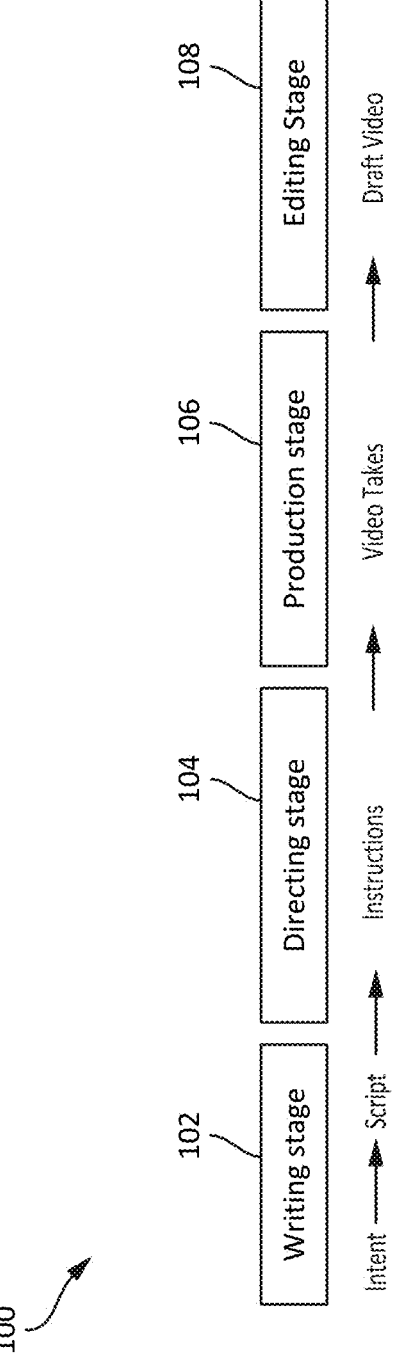
FIG. 1 illustrates an example of a content production process according to some aspects of the present disclosure.

Demand for rich media content has steadily grown over the past decade and is expected to grow substantially over the coming years. Rich media content and other content is often created by groups of individual contributors. Mobile devices have empowered people around the world to become content creators and marketers. For example, a small team of freelance artists armed with mobile phones may collaborate and contribute to a media (e.g., video) production. In many cases, individual team members are responsible for different tasks such as generating an idea for media content, generating a narrative for the media content, acquiring the media content, and producing (e.g., editing) the media content. For example, as shown in FIG. 1, a video content production process 100 may include a writing stage 102 in which a team member that serves as a writer transforms the team's intent into a script, a directing stage 104 in which a team member that serves as a director transforms the script into a instructions that guides other team members to capture content (e.g., video) according to the team's intent, a production stage 106 in which a team member that serves as a producer acquires and organizes the captured content by the team members, and an editing stage 108 in which a team member that serves as an editor edits and combines the organized captured content into a video production that reflects the team's intent.

Participants in a video production project may rely on commercially available content production tools to assist with one or more content production tasks, but the resources (e.g., time, money, expertise) these participants have available to dedicate to these tasks is often limited. Additionally, while individual participants may be in communication with each other, there is often a burden when participants attempt to communicate with and organize tasks among a team of participants. Moreover, while some of the commercially available content production tools includes templates and other features to automate the video production process, these tools are expensive. There is currently no unified tool that understands the complete video production process and the creative tasks involved in producing video. As a result, conventional content production tools are limited in their capacity to facilitate workflow between and among participants.

The features and techniques disclosed herein overcome these challenges by facilitating video generation. Various features and techniques disclosed herein provide and support a platform that allows participants in a video generation project to interact with a computing system to produce videos quickly and efficiently without the cost and time involved with traditional methods of video production. Additionally, with the features and techniques described throughout, creative workflows can be automatically generated, enhanced, defined, and/or modified based on input from one or more participants, where each creative workflow can efficiently and/or specifically identify specifications of a video being produced. As such, participants can focus their attention on the creative aspects of a video production process.

Figure 2:
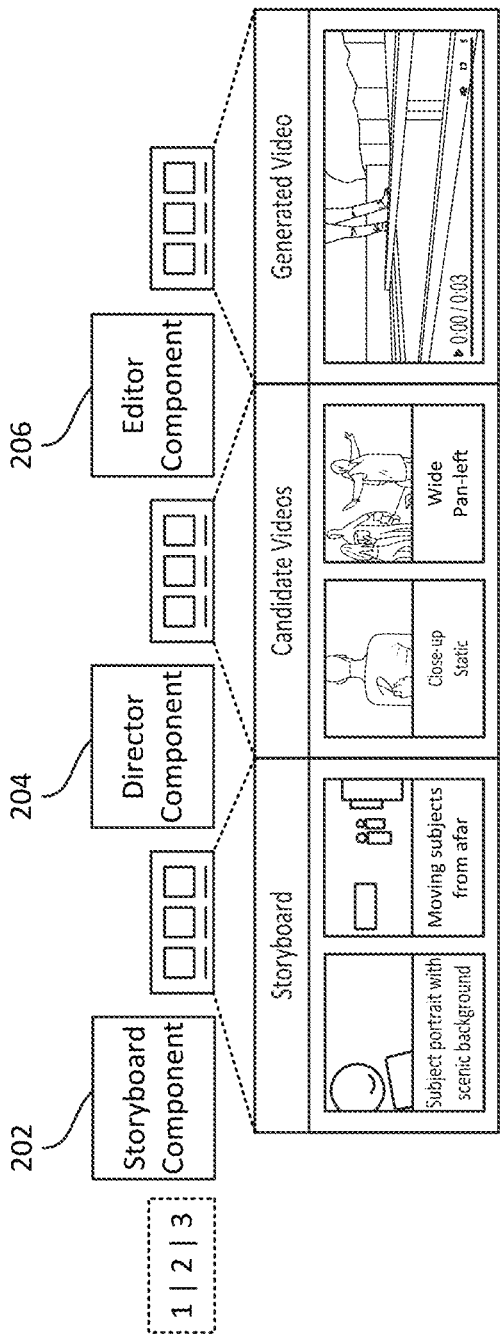
FIG. 2 illustrates an example of a storyboard component, a director component, and an editor component according to some aspects of the present disclosure.

In some instances, as shown in FIG. 2, video generation can be facilitated with a storyboard component 202, a director component 204, and an editor component 206. In some instances, as shown in FIG. 2, the storyboard component 202 can generate a storyboard, the director component 204 can determine video attributes for the storyboard, and the editor component 206 can generate a video. The storyboard component 202 can generate the storyboard based on an inspirational video. The storyboard component 202 can segment the inspirational video and generate storyboard panels for video segments using a machine-learning model. In some instances, the storyboard panels can be presented with textual labels that are descriptive of the contents of the video segments used to generate the storyboard panels. The director component 204 can determine video attributes for the storyboard panels based on the video segments. The director component 204 can extract features from the video segments and classify the extracted features with video attributes using a machine-learning model. In some instances, the storyboard panels can also be presented with textual labels that are descriptive of the video attributes. In some instances, a user of the intelligent creative assistant 300 can view the storyboard panels and the textual labels to gain insight into a video generation plan for generating the video and capture candidate videos for the storyboard panels. The editor component 206 can generate the video based on the candidate videos. The editor component 206 can generate the video using a machine-learning model. The machine-learning model can include a deep editor that can determine scores and editing actions for the candidate videos, identify which candidate videos should be used to generate the video, and edit and combine the candidate videos into the generated video based on a context in the video segments and the candidate videos. In some instances, the deep editor can determine scores and editing actions based on an encoder and decoder and/or a computational fabric.

In some instances, the storyboard component 202, director component 204, and editor component 206 are configured with hardware and software that enables the storyboard component 202, director component 204, and editor component 206 to store and manage data and facilitate video generation. In some instances, each of the storyboard component 202, director component 204, and editor component 206 can be any kind of computing device or computing system. For example, the storyboard component 202, director component 204, and editor component 206 can be a desktop computer, a personal computer, a workstation, and/or any variation thereof. In some instances, storyboard component 202, director component 204, and editor component 206 can form part of a distributed computing system. In some instances, storyboard component 202, director component 204, and editor component 206 can be any kind of mobile or portable electronic device. For example, storyboard component 202, director component 204, and editor component 206 can be a smart phone, a laptop computer, a tablet computer, and/or any variation thereof. In other instances, storyboard component 202, director component 204, and editor component 206 can be any kind of electronic device that is configured to store and manage data and facilitate video generation in accordance with a part of all of the methods disclosed herein. In some instances, the storyboard component 202, director component 204, and editor component 206 are included an intelligent creative assistant.

Figure 3:
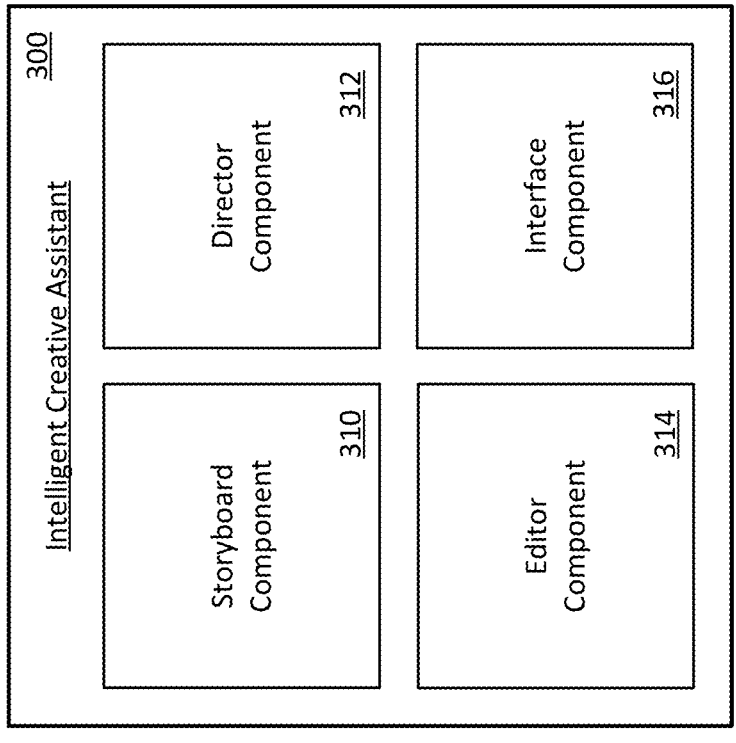
FIG. 3 illustrates an example of an intelligent creative assistant according to some aspects of the present disclosure.

FIG. 3 shows example of an intelligent creative assistant 300. As shown in FIG. 3, the intelligent creative assistant 300 includes a storyboard component 310, a director component 312, an editor component 314, and an interface component 316.

The storyboard component 310 is configured to generate a storyboard (i.e., video generation plan) based on an inspirational video. The inspirational video can serve as a narrative (e.g., a theme, a story, a creative direction) for a video generation plan for generating a video. In some instances, the inspirational video can be a certain length (e.g., between 1 minute and 5 minutes in length). In some instances, the inspirational video can be uploaded to a server in communication with the intelligent creative assistant 300 by a user of the intelligent creative assistant 300. In some instances, a user can be an individual person, a group of people (e.g., an artistic team), and/or client device (e.g., a mobile phone). In some instances, the user of the intelligent creative assistant 300 can upload the inspirational video to the server using one or more graphical user interface pages generated by the interface component 316 of the intelligent creative assistant 300 (e.g., via an Internet-based portal, an application programming interface, and the like).

The storyboard component 310 is configured to generate the storyboard based on the inspirational video by segmenting the inspirational video into video segments and generating a storyboard panel for each video segment. The storyboard includes storyboard panels which collectively represent the video generation plan. As used herein, a storyboard panel refers to an image, visualization, and/or graphic that represents the content depicted by a respective video segment. Each video segment can represent certain content of the inspirational video. For example, a first video segment can represent a first important scene in the inspirational video and a second video segment can represent a second important scene in the inspirational video. As such, a first storyboard panel can be generated for the first video segment and can be a visualization of the first important scene. Similarly, a second storyboard panel can be generated for the second video segment and can be a visualization of the second important scene.

The storyboard component 310 is configured to segment the inspirational video into video segments using one or more video analysis algorithms. The one or more video analysis algorithms can include video object segmentation algorithms, video instance segmentation algorithms, video semantic segmentation algorithms, video panoptic segmentation algorithms, and the like.

Figure 4:
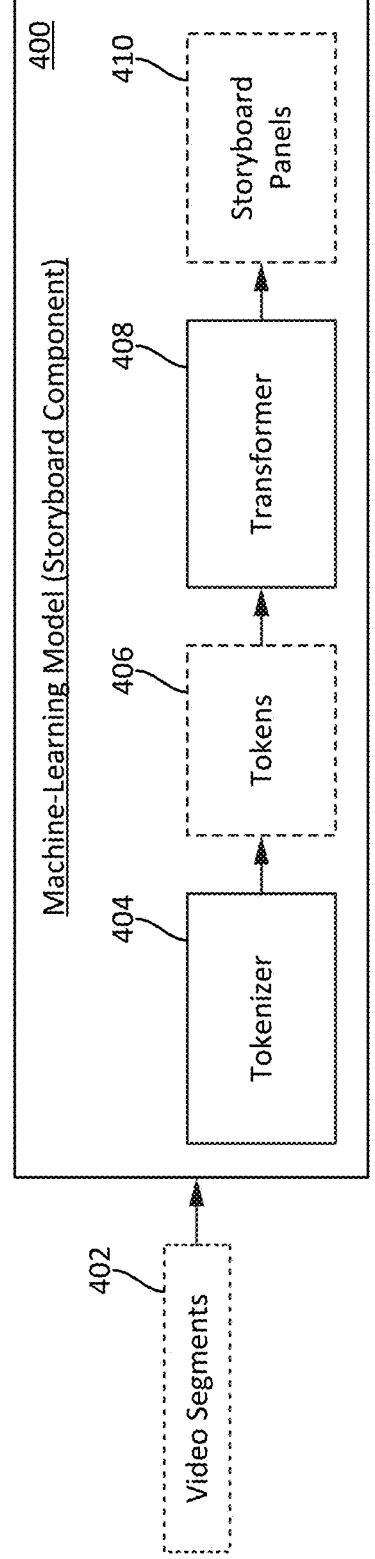
FIG. 4 illustrates an example of a machine-learning model for generating a storyboard according to some aspects of the present disclosure.

The storyboard component 310 is configured to generate a storyboard panel for each video segment using a machine-learning model. In some instances, as shown in FIG. 4, the machine-learning model 400 includes a tokenizer 404 for generating sets of tokens 406 from the video segments 402 and a transformer 408 for generating storyboard panels 410 from the sets of tokens 406.

The tokenizer 404 is configured to generate sets of tokens 406 from the video segments 402 by tokenizing the video segments 402. In some instances, the tokenizer 404 is configured to tokenize a video segment 402 by dividing the video segment 402 into a matrix of spatial-temporal (i.e., three-dimensional) cubes, generating a token (i.e., embedding) for each spatial-temporal cube, and arranging the tokens for the spatial-temporal cubes into a set of tokens 406 for the video segment 402. In some instances, the token for each spatial-temporal cube can represent the spatial content of each frame of the video segment 402 and context of that spatial content within the video segment 402. In some instances, the spatial content of each frame of the video segment 402 and the context of the spatial content within the video segment 402 can include features of the video segment 402 including a canonical view (i.e., narrow field-of-view) occurring in the video segment 402, motion of the image capture device used to capture the video segment 402, object and/or subject motion occurring in the video segment 402, object and/or subject pose and orientation occurring in the video segment 402, actions and/or facial expressions expressed by objects and/or subjects in the video segment 402, a length of the video segment 402, and the like. The foregoing features of the video segment 402 are not intended to be limiting and other features are possible.

Figure 5:
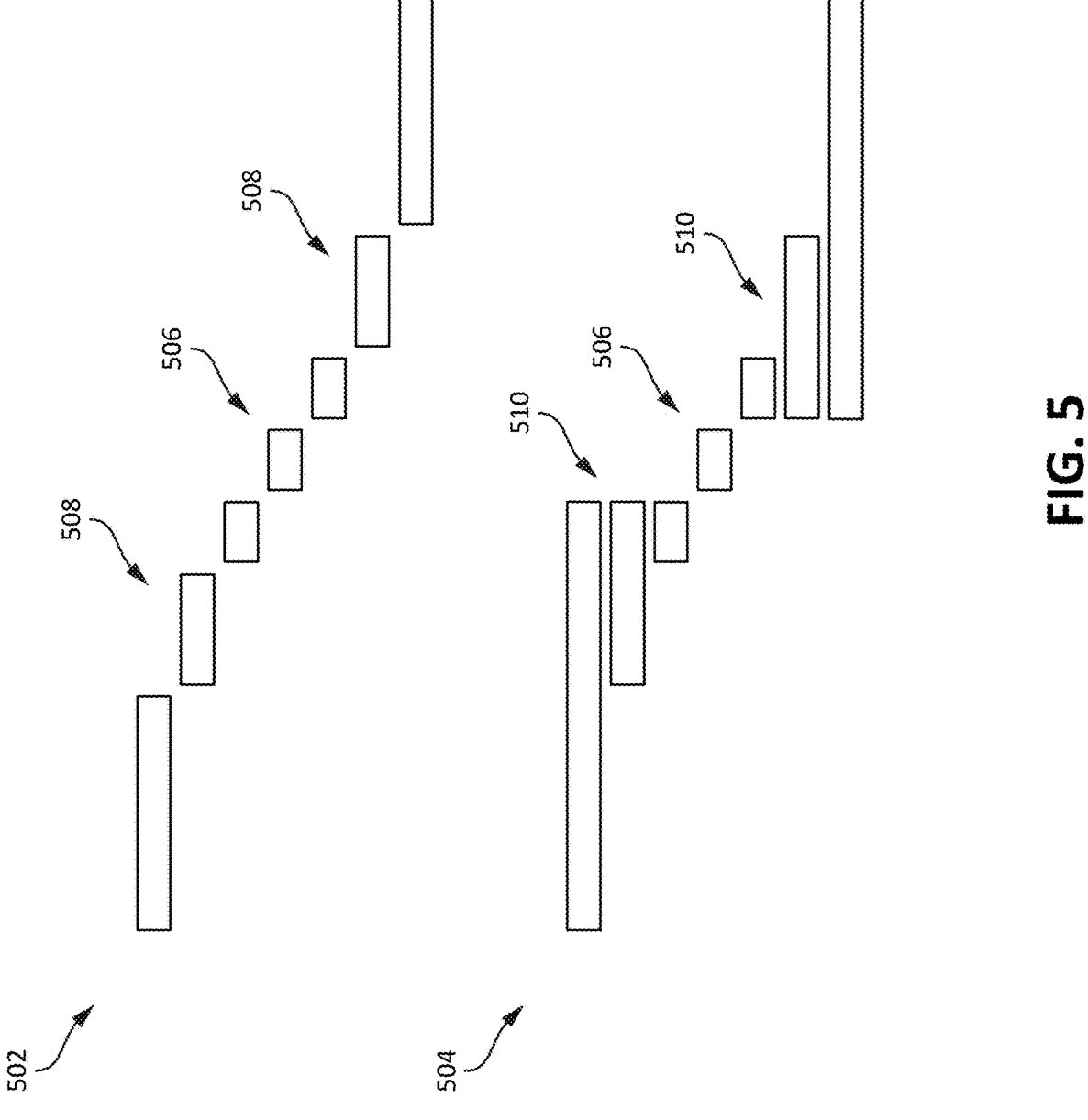
FIG. 5 illustrates an example of storyboard context according to some aspects of the present disclosure.
Figure 6:
FIG. 6 illustrates an example of training a machine-learning model for generating a storyboard according to some aspects of the present disclosure.

In some instances, the tokens can represent context of the video segment 402. In some instances, the context of the video segment 402 includes features depicted in video segments pertaining to portions of the inspirational video that occur prior to and after the portion of the inspirational video from which the video segment 402 is segmented. In some instances, the context of the video segment 402 can include features depicted in all of the video segments that occur prior to and after the portion of the inspirational video from which the video segment 402 is segmented. In some instances, the context of the video segment 402 can include features depicted in some (e.g., three) of the video segments that occur prior to and after the portion of the inspirational video from which the video segment 402 is segmented. For example, as shown in FIG. 5, for a video segment 506, context 508, 510 can be represented from a group of video segments that occur prior to and after the video segment 506. In some instances, context 508, 510 can be represented by features depicted by subgroups of video segments within the groups of video segments that occur prior to and after the video segment 506. In some instances, context 508, 510 can be represented by features depicted by video segments in one subgroup of video segments that do not temporally overlap with features depicted by video segments in another subgroup of video segments (i.e., features in each subgroup are temporally independent). For example, in the scenario 502, context 508, 510 can be represented by non-temporally overlapping object pose and action expression features depicted by the video segments in each subgroup of video segments. In some instances, context 508, 510 can be represented by features depicted by video segments in one subgroup of video segments that temporally overlap with features depicted by video segments in another subgroup of video segments (i.e., some features depicted one subgroup are also depicted in an adjacent subgroup). For example, in the scenario 504, context 508, 510 can be represented by temporally overlapping object pose and action expression features depicted by the video segments in each subgroup of video segments. In this way, the tokens can represent context of the video segment 402 based on features depicted in the video segment 402 and the temporal relationship between those features and features depicted in video segments occurring prior to and after the video segment 402.

In some instances, the tokens for the spatial-temporal cubes can be arranged into the set of tokens 406 based on a position of a spatial-temporal cube in the matrix of spatial-temporal cubes. For example, a token for a spatial-temporal cube in the first column and first row of the matrix can be arranged in the set of tokens 406 before a token for a spatial-temporal cube in the first column and second row of the matrix.

In some instances, the tokenizer 404 is configured to generate a token for each spatial-temporal cube of the video segment 402 using one or more neural networks (e.g., convolutional neural networks and/or recurrent neural networks) and/or one or more vector quantized-variational autoencoders. In some instances, the one or more neural networks (e.g., convolutional neural networks and/or recurrent neural networks) and/or one or more vector quantized-variational autoencoders can be trained and fine-tuned with one or more corpora of training data including previously tokenized video segments labeled with a set of tokens. In some instances, the one or more neural networks (e.g., convolutional neural networks and/or recurrent neural networks) and/or one or more vector quantized-variational autoencoders can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other tokenizer arrangements are possible.

The transformer 408 is configured to generate storyboard panels 410 from the sets of tokens 406. In some instances, the transformer 408 is configured to generate one or more storyboard panels 410 for each set of tokens 406. In other instances, the transformer 408 is configured to generate one or more storyboard panels 410 for the sets of tokens 406. The transformer 408 is configured to generate one or more storyboard panels 410 from one or more sets of tokens 406 by mapping the one or more sets of tokens 406 to one or more intermediate representations (not shown) and mapping the one or more intermediate representations into one or more storyboard panels 410. In some instances, the transformer 408 can be configured to map the one or more sets of tokens 406 to the one or more intermediate representations (not shown) and map the one or more intermediate representations into the one or more storyboard panels 410 using one or more encoders and/or decoders. In some instances, the one or more encoders and/or decoders can be applied in parallel, sequentially, and/or hierarchically. In some instances, the one or more encoder and/or decoders can be combined in a shared architecture. In some instances, the transformer 408 can be configured to map the one or more sets of tokens 406 to the one or more intermediate representations (not shown) and map the one or more intermediate representations into the one or more storyboard panels 410 using one or more multi-head self-attention layers and/or one or more feed-forward networks. The foregoing in not intended to be limiting and the transformer 408 can be configured to map the one or more intermediate representations into the one or more storyboard panels 410 using one or more nearest neighbor, subsampling, and sketch generating approaches.

In some instances, the transformer 408 can be trained and fine-tuned with corpora of training data that includes previously generated storyboard panels and the video segments used to generate them. In some instances, the transformer 408 can be trained and fine-tuned using one or more training and fine-tuning techniques such as unsupervised learning, semi-supervised learning, supervised learning, transfer learning, backpropagation, Adam optimization, reinforcement learning, and the like. In some instances, the transformer 408 can be trained and fine-tuned using a masked modeling technique in which the transformer 408 learns to reconstruct the training data based on batches of masked training data (e.g., video segments with masked patches and/or frames). In some instances, the tokenizer 404 and the transformer 408 can be trained and fine-tuned sequentially and/or concurrently.

In some instances, in order to train the transformer 408, features 604 of frames of a video segment 602 included in the training data are extracted into a feature space 606, the feature space 606 is encoded into a latent space 608, the latent space 608 is reconstructed into a reconstructed space 610, video frames 612 are generated from the reconstructed space 610, and losses 614, 616, 618, and 620 representing differences between the video frames 612 and frames of the video segment 602 are calculated. In some instances, in order to train the transformer 408, an optimization algorithm can find a minima of one or more loss functions, the losses 614, 616, 618, and 620 can be calculated based on the minima using the one or more loss functions, and one or more weights of the transformer 408 can be determined and set based on the losses 614, 616, 618, and 620. In some instances, the features 604 of the frames of the video segment 602 include style features, composition features, expression features, pose features, action features, and the like. In some instances, the features 604 of the frames of the video segment 602 can include one or more residual features 622. In some instances, the one or more residual features 622 includes features of the frames of the video segment 602 not included in features 604. In some instances, the loss 614 is a perceptual loss that represents differences between high level features (e.g., style discrepancies) between the video frames 612 and frames of the video segment 602. In some instances, the loss 616 is a discriminative loss that represents differences between content objects (e.g., main subjects) in the frames of the video segment 602 and the same content objects (e.g., the same main subjects) in the video frames 612. In some instances, the loss 618 is a feature loss that represents the differences between the feature space 606 and the reconstructed space 610. In some instances, the loss 620 is a content loss that represents the differences between content in the frames of the video segment 602 and content in the video frames 612. The foregoing arrangements are not intended to be limiting and other transformer training arrangements are possible.

The storyboard component 310 can include one or more special-purpose or general-purpose processors. Such special-purpose processors can include processors that are specifically designed to perform the functions of the machine-learning model 400 and other components described herein. Such special-purpose processors can be application-specific integrated circuits (ASICs) or field-programmable gate arrays (FPGAs) which are general-purpose components that are physically and electrically configured to perform the functions described herein. Such general-purpose processors may execute special-purpose software that is stored using one or more non-transitory processor-readable mediums, such as random-access memory (RAM), flash memory, a hard disk drive (HDD), or a solid-state drive (SSD). Further, the functions of the storyboard component 310 can be implemented using a cloud-computing platform, which is operated by a separate cloud-service provider that executes code and provides storage for clients. In some embodiments, one or more functions of the storyboard component 310 can be performed by the director component 312 and the editor component 314.

The director component 312 is configured to determine video attributes for the storyboard panels 410 based on the video segments 402. In some instances, the video attributes represent desired attributes of the video to be generated. In some instances, the director component 312 is configured to determine one or more video attributes for each storyboard panel 410 based on the video segment 402 used to generate the respective storyboard panel.

In some instances, a video attribute can be a scale of an object or subject depicted in a video segment 402. The scale of an object or subject refers to the size of the object or subject depicted in the video segment 402 compared to the size of other features depicted in the video segment 402. In some instances, when the scale of the object or subject depicted in the video segment 402 is greater than a first predetermined scale threshold (i.e., the object or subject is larger than other features depicted in the video segment), a close-range video attribute can be determined for the storyboard panel 410 corresponding to the video segment 402 (i.e., the video attribute indicating that the object or subject appeared as if it was close to the image capturing device when the video segment 402 was captured). In some instances, the first predetermined scale threshold is 50%. Other percentages are possible. For example, the first predetermined scale threshold can be set between 50%-70%). In some instances, when the scale of the object of subject depicted in the video segment 402 is less than a second predetermined scale threshold (i.e., the object or subject is smaller than other features depicted in the video segment), the far-range video attribute can be determined for the storyboard panel 410 corresponding to the video segment 402 (i.e., the video attribute indicating that the object or subject appeared as if it was far from the image capturing device when the video segment 402 was captured). In some instances, the second predetermined scale threshold is 25%. Other percentages are possible. For example, the second predetermined threshold can be set between 20-30%. In some instances, when the scale of the object or subject is between the second predetermined scale threshold and the first predetermined scale threshold (i.e., the object or subject is larger than some features and smaller than some features depicted in the video segment), a middle-range video attribute can be determined for the storyboard panel 410 corresponding to the video segment 402 (i.e., the video attribute indicating that the object or subject appeared as if it is not close to or far from the image captured device when the video segment 402 was captured).

In some instances, a video attribute can be a motion of an object or subject depicted in a video segment 402. The motion of an object or subject refers to the motion of the object or subject depicted in the video segment 402 compared to the motion of other features depicted in the video segment 402. In some instances, when the object or subject depicted in the video segment 402 moves in a direction away from and to the left of other features depicted in the video segment 402, a pan right video attribute can be determined for the storyboard panel 410 corresponding to the video segment 402 (i.e., the video attribute indicating that the object, subject, or image capturing device is moving to the left relative to other features depicted in the video segment). Similarly, in some instances, when the object or subject depicted in the video segment 402 moves in a direction away from and to the right of other features depicted in the video segment 402, a pan left video attribute can be determined for the storyboard panel 410 corresponding to the video segment 402 (i.e., the video attribute indicating that the object, subject, or image capturing device is moving to the right relative to other features depicted in the video segment). In some instances, when the object or subject depicted in the video segment 402 is not moving, a static video attribute can be determined for the storyboard panel 410 corresponding to the video segment 402 (i.e., the video attribute indicating that the object, subject, or image capturing device is not moving relative to other features depicted in the video segment).

The foregoing scale and motion video attributes are not intended to be limiting and other video attributes representing other features of the object or subject depicted in the video segment 402 can be determined.

Figure 7:
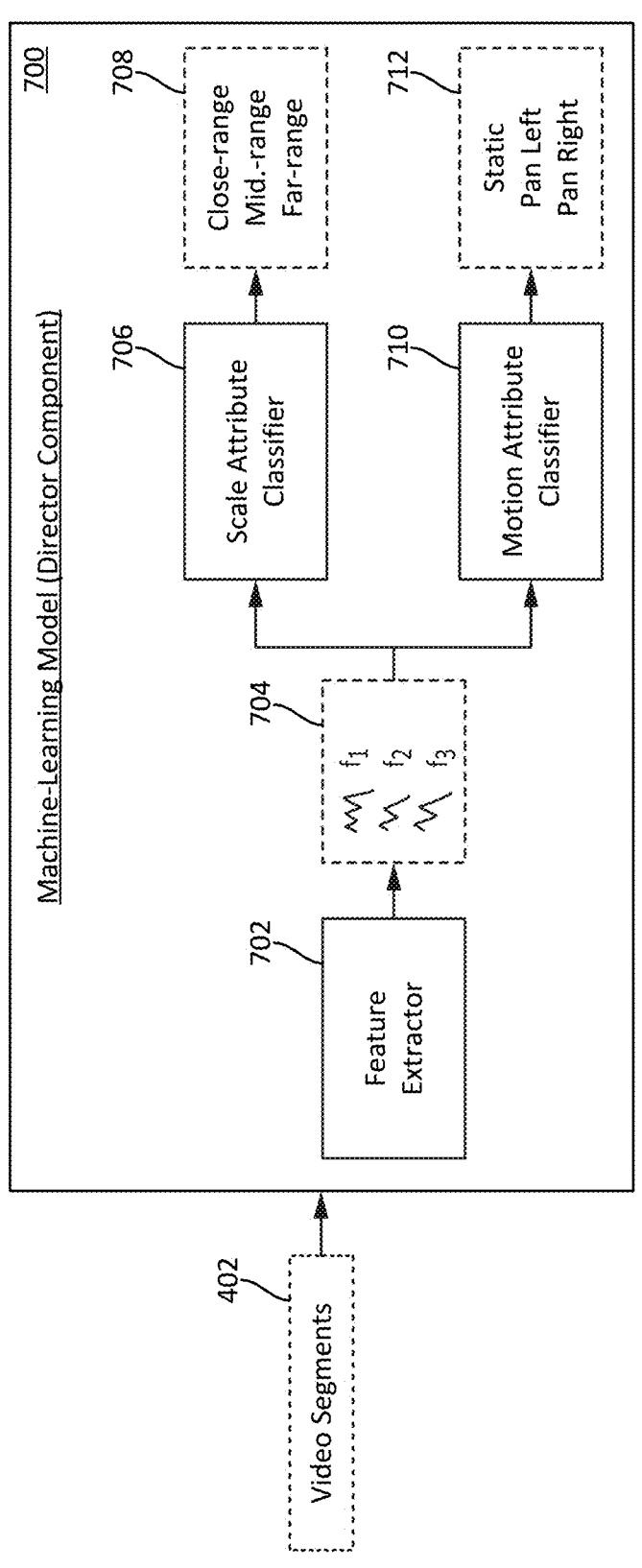
FIG. 7 illustrates an example of a machine-learning model for determining video attributes according to some aspects of the present disclosure.

The director component 312 is configured to determine video attributes for the storyboard panels 410 based on the video segments 402 using a machine-learning model. In some instances, as shown in FIG. 7, the machine-learning model 700 includes a feature extractor 702 for extracting feature vectors 704 from the video segments 402, a scale attribute classifier 706 for classifying the extracted feature vectors 704 with scale video attributes 708, and a motion attribute classifier 710 for classifying the extracted feature vectors 704 with motion video attributes 712. In some instances, the feature extractor 702 is configured to extract feature vectors 704 from the video segments 402 using one or more image processing algorithms. In some instances, the one or more image processing algorithms include object/subject detection algorithms, pose detection algorithms, motion detection/optical flow algorithms, and the like. In some instances, the scale attribute classifier 706 is configured to classify each video segment 402 with one of the close-range, middle-range, or far-range video attributes included in the class of scale video attributes 708 based on the features of the object or subject depicted in the video segment 402 as represented by the feature vectors 704 extracted for the video segment 402. Similarly, in some instances, the motion attribute classifier 710 is configured to classify each video segment 402 with one of the static, pan left, or pan right video attributes included in the class of motion video attributes 712 based on the extracted feature vectors 704 for the video segment 402. In some instances, the scale attribute classifier 706 and the motion attribute classifier 710 can include one or more neural networks. In some instances, the scale attribute classifier 706 and the motion attribute classifier 710 can be perceptron, naive bayes, decision tree, logistic regression, k-nearest neighbor, random forest, and/or support vector machine-type classifiers. In some instances, the one or more neural networks can be pre-trained to classify video attributes. In some instances, the scale attribute classifier 706 can be trained and fine-tuned with video segments depicting objects or subjects at different scales and including one or more labels characterizing the respective scales of the objects or subjects depicted in the video segments. Similarly, in some instances, the motion attribute classifier 710 can be trained and fine-tuned with video segments depicting objects or subjects exhibiting different motion and including one or more labels characterizing the respective motion exhibited by the objects or subjects. In some instances, the scale attribute classifier 706 and the motion attribute classifier 710 can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other classifier arrangements are possible.

The director component 312 can include one or more special-purpose or general-purpose processors. Such special-purpose processors can include processors that are specifically designed to perform the functions of the director component 312 and other components described herein. Such special-purpose processors can be ASICs or FPGAs which are general-purpose components that are physically and electrically configured to perform the functions described herein. Such general-purpose processors may execute special-purpose software that is stored using one or more non-transitory processor-readable mediums, such as RAM, flash memory, a HDD, or a SSD. Further, the functions of the director component 312 can be implemented using a cloud-computing platform, which is operated by a separate cloud-service provider that executes code and provides storage for clients. In some embodiments, one or more functions of the director component 312 can be performed by the storyboard component 310 and the editor component 314.

Figure 8:
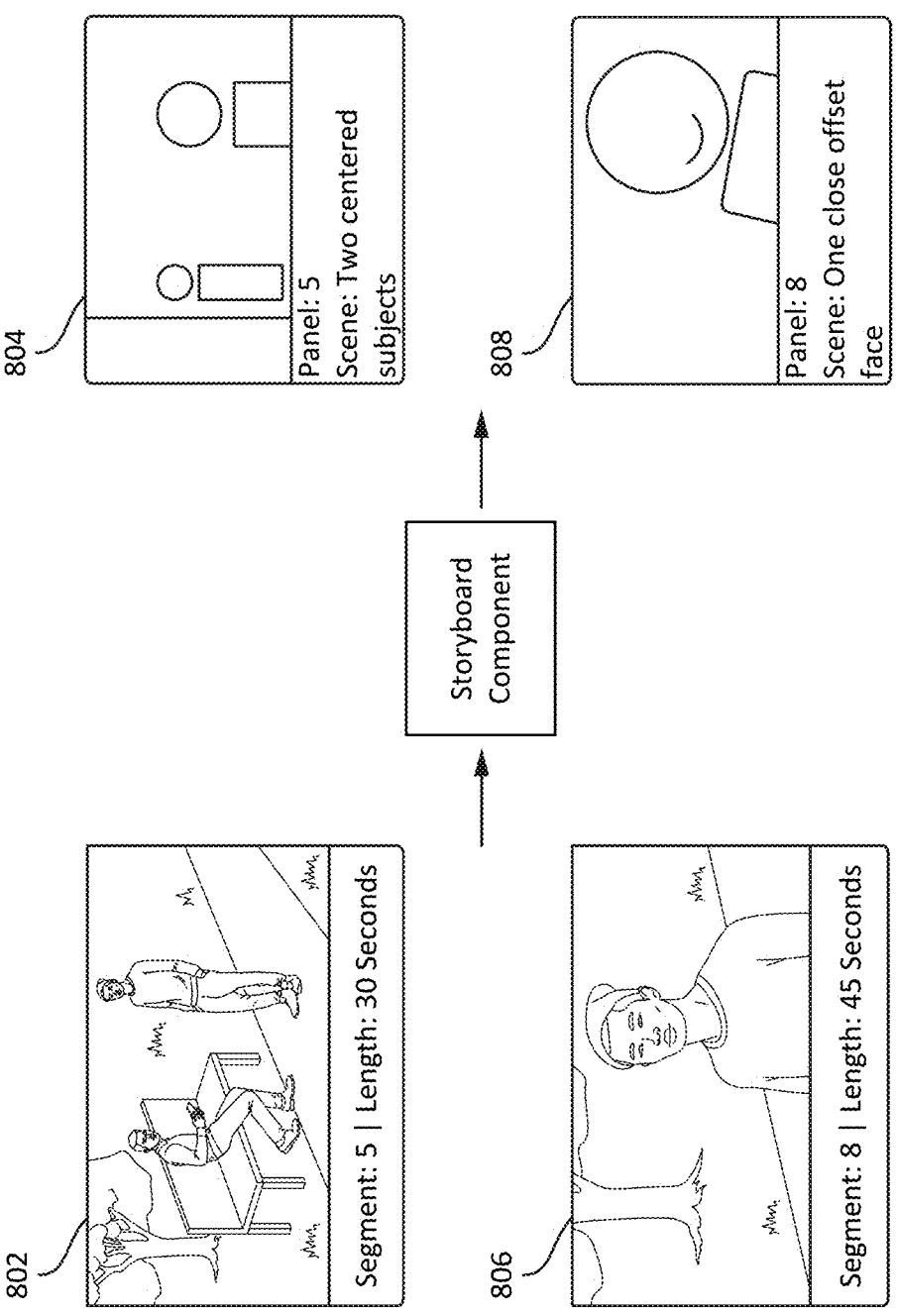
FIG. 8 illustrates an example of a storyboard according to some aspects of the present disclosure.

In some instances, the interface component 316 of the intelligent creative assistant 300 is configured to generate one or more graphical user interface pages for presenting the storyboard panels 410 to a user of the intelligent creative assistant 300. In some instances, each storyboard panel 410 can be presented with one or more first textual labels representing the contents of the video segment 402 used to generate the respective storyboard panel. In some instances, the one or more first textual labels can be descriptive of the contents of the video segment 402 used to generate the respective storyboard panel 410. For example, as shown in FIG. 8, the first storyboard panel 804 for the first video segment 802 can be presented with the first textual label "Two centered subjects" that represents the content of the first video segment 802 and the second storyboard panel 808 for the second video segment 806 can be presented with the textual label "One close offset face" that represents the content of the second video segment 806. In some instances, the one or more first textual labels can be generated and modified based on an input received by the intelligent creative assistant 300 from the user of the intelligent creative assistant 300.

Figure 9:
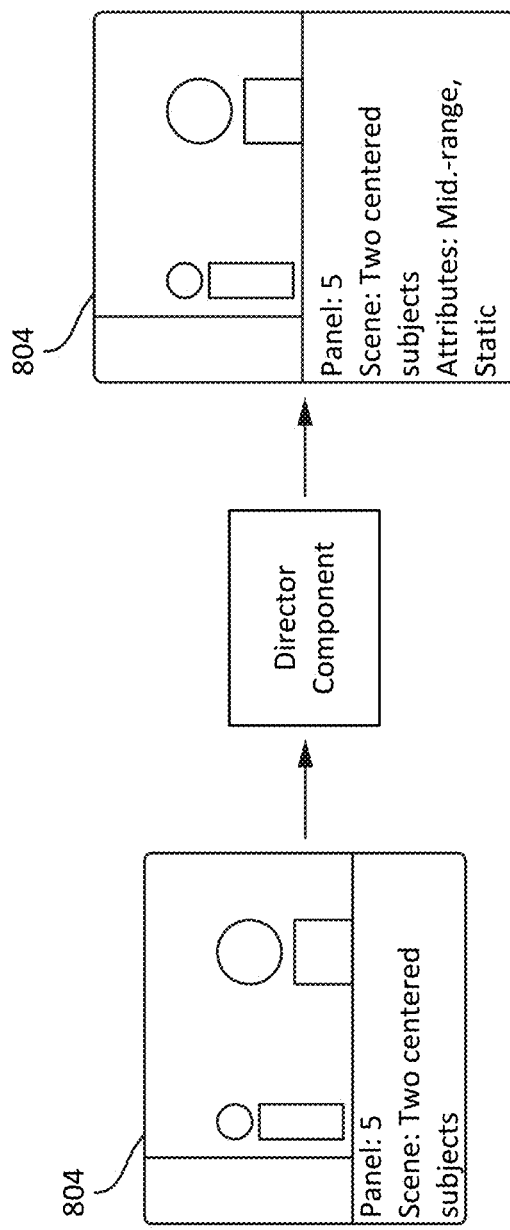
FIG. 9 illustrates another example of a storyboard according to some aspects of the present disclosure.

In some instances, each storyboard panel 410 can also be presented with one or more second textual labels representing the video attributes determined by the director component 312 for the respective storyboard panel 410. In some instances, the one or more second textual labels can be descriptive of the video attributes determined by the director component 312 for the respective storyboard panel 410. For example, as shown in FIG. 9, the first storyboard panel 804 for the first video segment 802 can be presented with the second textual labels "Mid-range" and "Static" that represent the scale video attribute 708 and the motion video attribute 712 determined by the director component 312 for the first storyboard panel 804. In some instances, the one or more second textual labels can be modified based on an input received by the intelligent creative assistant 300 from the user of the intelligent creative assistant 300. In some instances, based on the input received by the intelligent creative assistant 300 from the user of the intelligent creative assistant 300, a second textual label with a storyboard panel 410 can be removed, added, and/or changed to another second textual label. The foregoing presentation of storyboard panels 410 is not intended to be limiting and other presentations are possible.

In some instances, users of the intelligent creative assistant 300 can view the storyboard panels 410 along with textual labels describing the contents of the video segments 402 used to generate the storyboard panels 410 and textual labels describing the video attributes determined for the storyboard panels 410, gain insight into the video generation plan for generating the video, and capture one or more candidate videos for each of the storyboard panels 410. In some instances, a first user can capture one or more candidate videos for a storyboard panel of the storyboard panels 410 and a second user can capture one or more candidate videos for another storyboard panel for the storyboard panels 410. In some instances, the first and second users can capture one or more candidate videos for each storyboard panel of the storyboard panels 410. In some instances, a user can be an individual person, a group of people (e.g., an artistic team), and/or client device (e.g., a mobile phone). In some instances, each of the candidate videos can be uploaded to a server in communication with the intelligent creative assistant 300 by the user of the intelligent creative assistant 300. In some instances, the user of the intelligent creative assistant 300 can upload candidate videos to the server using one or more graphical user interface pages generated by the interface component 316 of the intelligent creative assistant 300 (e.g., via an Internet-based portal, an application programming interface, and the like).

The interface component 316 can include one or more special-purpose or general-purpose processors. Such special-purpose processors can include processors that are specifically designed to perform the functions of the interface component 316 and other components described herein. Such special-purpose processors can be ASICs or FPGAs which are general-purpose components that are physically and electrically configured to perform the functions described herein. Such general-purpose processors may execute special-purpose software that is stored using one or more non-transitory processor-readable mediums, such as RAM, flash memory, a HDD, or a SSD. Further, the functions of the interface component 316 can be implemented using a cloud-computing platform, which is operated by a separate cloud-service provider that executes code and provides storage for clients.

Figure 10:
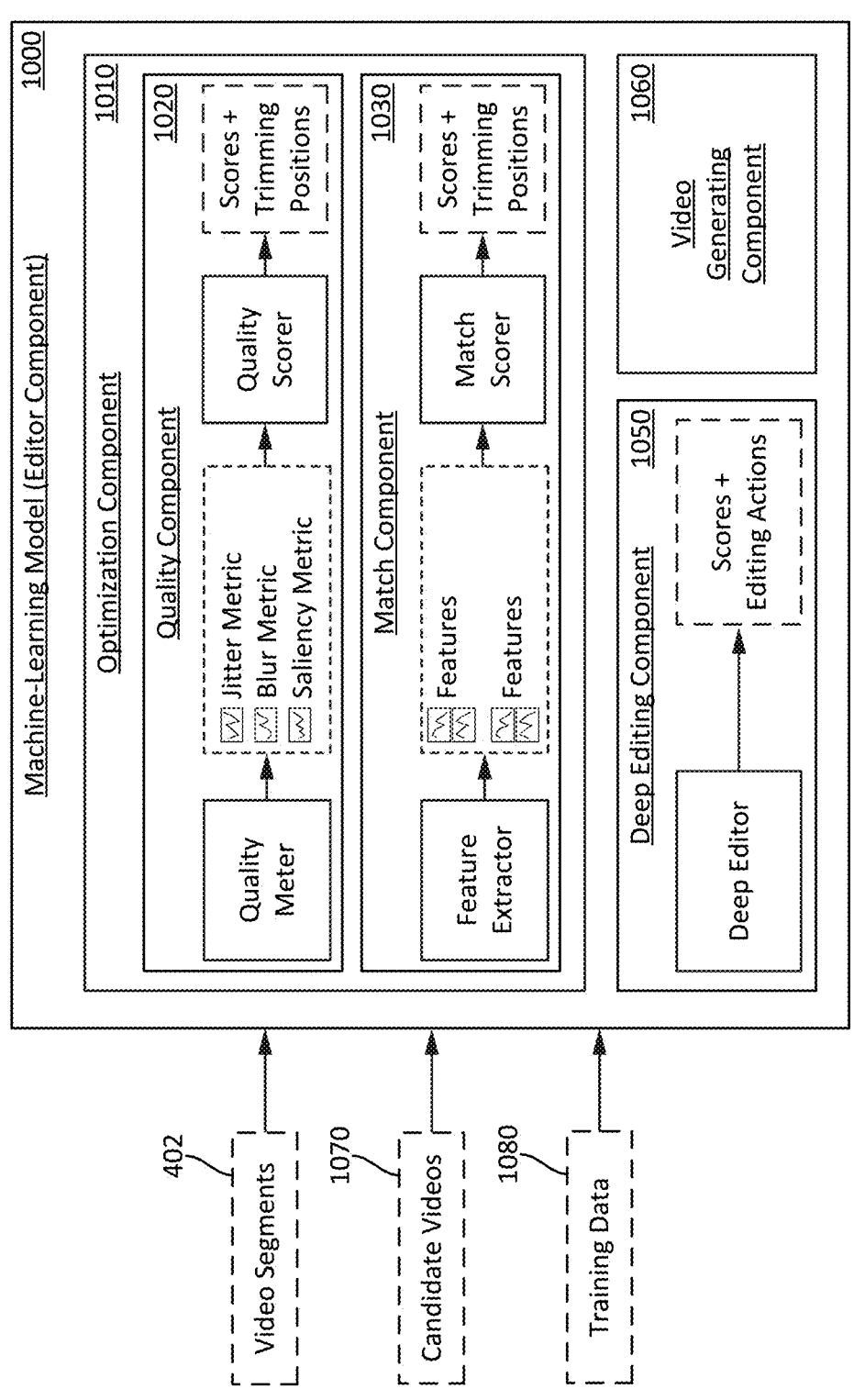
FIG. 10 illustrates an example of a machine-learning model for generating a video according to some aspects of the present disclosure.

The editor component 314 is configured to generate the video of the video generation plan based on the candidate videos 1070. The editor component 314 is configured to generate the video of the video generation plan based on the candidate videos 1070 using a machine-learning model. In some instances, the machine-learning model 1000 is configured to receive the candidate videos 1070, receive the video segments 402, identify which candidate video of the candidate videos 1070 for each storyboard panel of the storyboard panels 410 should be used to generate the video, and generate the video based on the identified candidate videos for the storyboard panels. In some instances, as shown in FIG. 10, the machine-learning model 1000 includes an optimization component 1010, a deep editing component 1050, and a video generating component 1060.

The optimization component 1010 includes a quality component 1020 and a match component 1030. The quality component 1020 includes a quality meter that is configured to determine quality metrics for the candidate videos 1070 and a quality scorer that is configured to determine quality scores and trimming positions for the candidate videos 1070. The quality meter is configured to determine quality metrics for each candidate video of the candidate videos 1070. In some instances, the quality meter is configured to determine quality metrics for each candidate video of the candidate videos 1070 by calculating a jitter metric, a blur metric, and a contrast metric for each frame of the respective candidate video and averaging the jitter metric, the blur metric, and the contrast metric calculated for the respective frame. The jitter metric represents unintentional image capturing device movements that occurred when a candidate video was captured. In some instances, the jitter metric can be calculated using one or more jitter, camera shake, motion detection, optical flow algorithms, and the like. The blur metric represents a degree to which features (e.g., foreground and background objects) in the candidate video are in focus (i.e., the degree to which a portion of the candidate video contains high frequency components with sharp extended edges). In some instances, the blur metric can be calculated using one or more autofocusing, focus detection, motion blur, motion detection, optical flow algorithms, and the like. The contrast metric represents differences in color and luminance between objects, subjects, regions, and features in the candidate video. In some instances, the contrast metric can be calculated based on root mean square (i.e., standard deviation of the filtered response).

The quality scorer is configured to determine a quality score and trimming positions for each candidate video of the candidate videos 1070. In some instances, the quality scorer is configured to determine a quality score and trimming positions for each candidate video of the candidate videos 1070 by applying a boxcar function to the quality metrics determined for the respective candidate video. In some instances, the quality score can be determined by averaging the quality metrics for the frames of the respective candidate video within a start of a peak of the boxcar function and an end of the peak of the boxcar function. In some instances, the quality score can be normalized such that the normalized quality score falls in a range between zero and one with zero representing that the respective candidate video is of the lowest quality and one representing that the respective candidate video of the highest quality. In some instances, the trimming positions include a first trimming position that indicates that a portion of the respective candidate video located between the start of the respective candidate video and the first trimming position should be trimmed when generating the video and a second trimming position that indicates that a portion of the respective candidate video between the end of the respective candidate video and the second trimming position should be trimmed when generating the video.

The match component 1030 includes a feature extractor that is configured to extract features from the video segments 402 and the candidate videos 1070 and a match scorer that is configured to determine match scores and trimming positions for the candidate videos 1070. The feature extractor is configured to extract features from each video segment of the video segments 402 and each candidate video of the candidate videos 1070. In some instances, the feature extractor is configured to extract features from each video segment of the video segments 402 and each candidate video of the candidate videos 1070 by using a feature extractor such as the feature extractor 702 of the machine-learning model 700. In some instances, the feature extractor is configured to extract features from each video segment of the video segments 402 and each candidate video of the candidate videos 1070 by using one or more image processing algorithms and/or natural language processing algorithms. In some instances, the image processing algorithms include object/subject detection algorithms, pose detection algorithms, motion detection/optical flow algorithms, and the like. In some instances, the one or more natural language processing algorithms can include speech detection algorithms, speech recognition algorithms, and the like.

The match scorer is configured to determine a match score and trimming positions for each candidate video of the candidate videos 1070. In some instances, the match scorer is configured to determine a match score for each candidate video of the candidate videos 1070 by determining the similarity between the features extracted from the respective candidate video and the features extracted from a video segment corresponding to the respective candidate video. In some instances, the video segment corresponding to the respective candidate video is the video segment used to generate the storyboard panel of the storyboard panels 410 in which the respective candidate video was captured for. The similarity between the features extracted from the respective candidate video and the features extracted from a video segment corresponding to the respective candidate video can be determined using a similarity measure. In some instances, the similarity can fall in a range between zero and one with zero representing no similarity between the respective candidate video and the corresponding video segment and one representing a maximum similarity between the respective candidate video and the corresponding video segment.

In some instances, the match scorer is configured to determine trimming positions for each candidate video of the candidate videos 1070 by dividing the respective candidate video and corresponding video segment into groups of frames and comparing the similarity between features extracted from the respective groups of frames. In some instances, the trimming positions can be determined based on the group of frames among the groups of frames in the respective candidate video that is most similar to a corresponding group of frames among the groups of frames in the corresponding video segment. In some instances, a first trimming position that indicates that a portion of the respective candidate video located between the start of the respective candidate video and the first trimming position should be trimmed when generating the video can be set at the start of the group of frames determined to be most similar and a second trimming position that indicates that a portion of the respective candidate video between the end of the respective candidate video and the second trimming position should be trimmed when generating the video can be set at the end of the group of frames determined to be most similar.

The optimization component 1010 is configured to determine joint scores and joint trimming positions for the candidate videos 1070 based on quality scores and trimming positions for the candidate videos 1070 determined by the quality scorer and the match scores and trimming positions for the candidate videos 1070 determined by the match scorer. In some instances, the optimization component 1010 is configured to determine a joint score for each candidate video of the candidate videos 1070 based on the quality score for respective candidate video and the match score for the respective candidate video. In some instances, the optimization component 1010 is configured to determine a joint score for each candidate video of the candidate videos 1070 by combing the quality score for respective candidate video and the match score for the respective candidate video. In some instances, the optimization component 8210 is configured to combine the quality score for respective candidate video and the match score for the respective candidate video by adding the quality score for respective candidate video and the match score for the respective candidate video. In some instances, the optimization component 8210 is configured to combine the quality score for respective candidate video and the match score for the respective candidate video by averaging the quality score for respective candidate video and the match score for the respective candidate video. In some instances, the quality score for respective candidate video and the match score for the respective candidate video can be added or averaged by weighting the quality score and the match score for the respective candidate video and adding or averaging the weighted quality score and the weighted match score for respective candidate video. In some instances, the weight given to the quality score is greater than the weight given to the match score. In some instances, the weights given to the quality score and the match score can be set by a user of the intelligent creative assistant 300.

Similarly, in some instances, the optimization component 1010 is configured to determine joint trimming positions for each candidate video of the candidate videos 1070 based on the trimming positions determined by the quality scorer and match scorer for the candidate videos 1070. In some instances, the optimization component 1010 is configured to determine joint trimming positions for each candidate video of the candidate videos 1070 by averaging the first trimming positions determined by the quality scorer and the match scorer for the respective candidate video and the second trimming positions determined by quality scorer and the match scorer for the respective candidate video.

The deep editing component 1050 is configured to determine editing scores and editing actions for the candidate videos 1070. The editing scores represent how well the candidate videos 1070 fit into the video generation plan as represented by the storyboard panels 410. In some instances, the editing scores represent how well candidate videos captured for a storyboard panel fit into the video generation plan as represented by the respective storyboard panel. The editing actions represent actions to be taken by the video generating component 1060 in generating the video. In some instances, editing actions include, but are not limited to, a trimming action that specifies first and second trimming positions for the candidate videos, a cropping action that specifies how candidate videos should be cropped, a blending action that specifies how the trimmed candidate videos should be combined to generate the video, a color correction action that specifies how the colors in the candidate videos should be corrected, a contrast correction action that specifies how contrast in the candidate videos should be corrected, and a brightness correction action that specifies how brightness in the candidate videos should be corrected.

Figure 11:
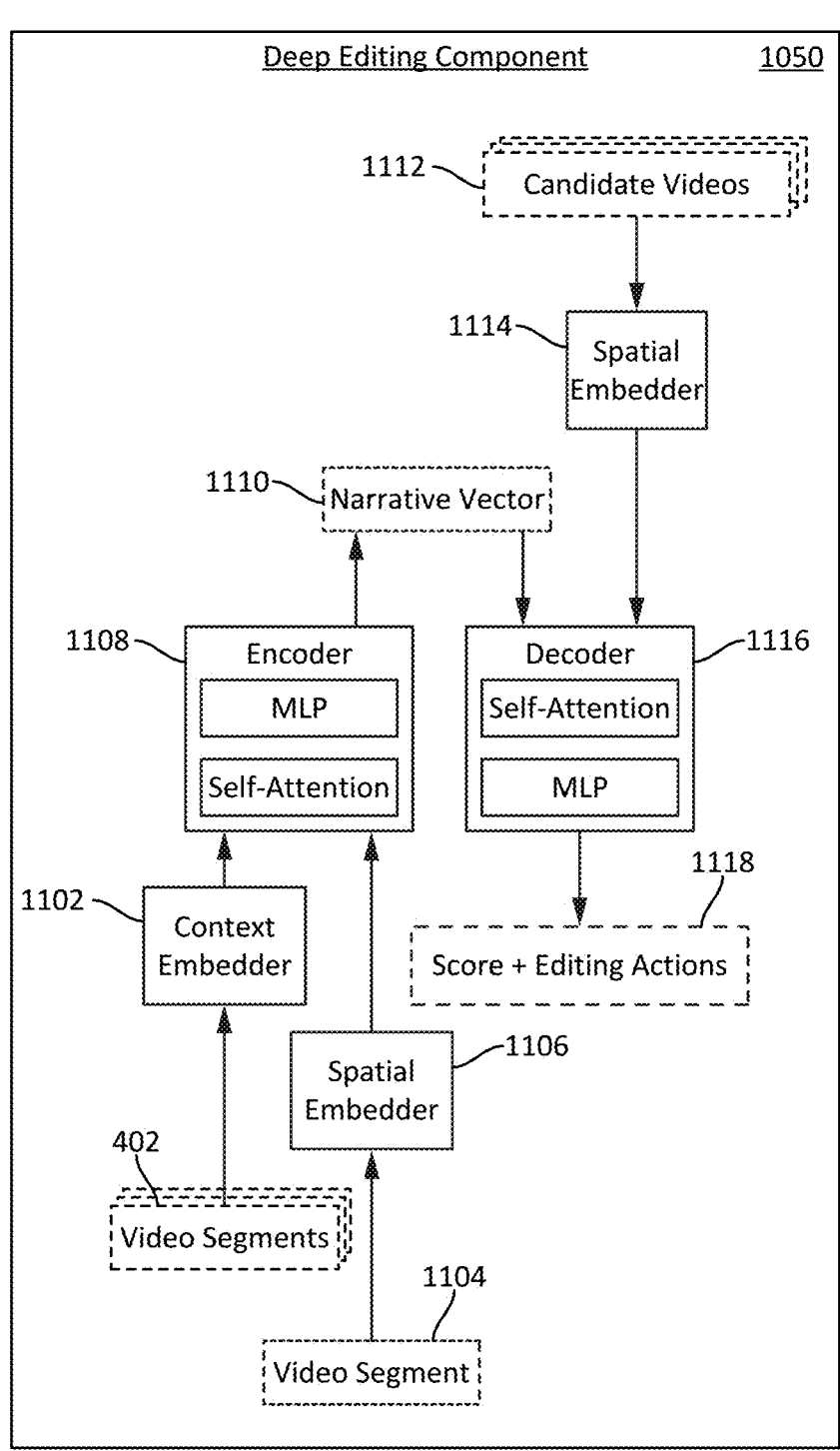
FIG. 11 illustrates an example of a deep editor according to some aspects of the present disclosure.

The deep editing component 1050 is configured to determine editing scores and editing actions for the candidate videos 1070 using a machine-learning model. In some instances, as shown in FIG. 11, the machine-learning model can include a context embedder 1102 that generates a context embedding for the video segments 402, a spatial embedder 1106 that generates a spatial embedding for a video segment 1104, an encoder 1108 that generates a narrative vector 1110 based on the context embedding and spatial embedding, a spatial embedder 1114 that generates spatial embeddings for candidate videos 1112, and a decoder 1116 that predicts editing scores and editing actions 1118 for the candidate videos 1112. In some instances, the video segment 1104 is a video segment of video segments 402. In some instances, the candidate videos 1112 are candidate videos of the candidate videos 1070 that were captured for a respective storyboard panel of storyboard panels 410. In some instances, the machine-learning model is configured to determine editing scores and editing actions for the candidate videos 1112 that were captured for a storyboard panel of storyboard panels 410 based on the video segment of video segments 402 that was used to generate the respective storyboard panel and the video segments 402 that were used to generate the storyboard panels 410. In this way, using the machine-learning model, the deep editing component 1050 can determine how well each candidate video captured for a storyboard panel fits into the video generation plan as represented by the respective storyboard panel and editing actions to take if a respective candidate video captured for the respective storyboard panel were to be used in generating the video (to be described later).

The context embedder 1102 is configured to generate a context embedding (e.g., a context vector and/or a context token) that represents the spatial and temporal dependencies of the features of the video segment 1104 relative to the video segments of video segments 402 that occur before the video segment 1104 and features of the video segment 1104 relative to the video segments of video segments 402 that occur after the video segment 1104. In some instances, the context embedder 1102 is configured to generate a context embedding for a video segment of the video segments 402 using one or more neural networks (e.g., three-dimensional convolutional neural networks, convolutional long short-term memory neural networks, gated recurrent units, transformers). In some instances, the one or more neural networks can be pre-trained to generate context embeddings for videos. In some instances, the one or more neural networks can be trained and fine-tuned with one or more corpora of training data 1080 including videos labeled with context embeddings. In some instances, the one or more neural networks can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other context embedder arrangements are possible.

The spatial embedder 1106 is configured to generate a spatial embedding (e.g., a spatial vector and/or a spatial token) that represents the spatial features of the video segment 1104. In some instances, the spatial embedder 1106 is configured to generate a spatial embedding using one or more neural networks (e.g., a convolutional neural network). In some instances, the one or more neural networks can be pre-trained to generate spatial embeddings for videos. In some instances, the one or more neural networks can be trained and fine-tuned with one or more corpora of training data 1080 including videos labeled with spatial embeddings. In some instances, the one or more neural networks can be trained and fine-tuned using one or more training and fine-tuning techniques such as unsupervised learning, semi-supervised learning, supervised learning, transfer learning, transfer learning, backpropagation, Adam optimization, reinforcement learning, and the like. The foregoing arrangements are not intended to be limiting and other spatial embedder arrangements are possible.

The encoder 1108 is configured to generate a narrative vector 1110 based on the context embedding generated by the context embedder 1102 and the spatial embedding generated by the spatial embedder 1106. In some instances, the encoder 1108 includes one or more self-attention layers and one or more multilayer perceptron layers. In some instances, the encoder 1108 is configured to generate a narrative vector 1110 by concatenating the context embedding to the spatial embedding to form a concatenated embedding, transforming the concatenated embedding into an intermediate representation using the one or more self-attention layers, and predicting the intermediate representation into the narrative vector 1110 using the one or more multilayer perceptron layers. In some instances, the encoder 1108 can be trained and fine-tuned with one or more corpora of training data 1080 including videos labeled with context embeddings, spatial embeddings, and narrative vectors. In some instances, the encoder 1108 can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other encoder arrangements are possible.

The spatial embedder 1114 is configured to generate a spatial embedding (e.g., a spatial vector and/or a spatial token) for each candidate video of candidate videos 1112 that represents the spatial features of each candidate video of candidate videos 1112. In some instances, the spatial embedder 1114 is configured to generate a spatial embedding using the one or more neural networks (e.g., a convolutional neural network). In some instances, the one or more neural networks can be pre-trained to generate spatial embeddings for videos. In some instances, the one or more neural networks can be trained and fine-tuned with one or more corpora of training data 1080 including videos labeled with spatial embeddings. In some instances, the one or more neural networks can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other spatial embedder arrangements are possible.

The decoder 1116 is configured to predict an editing score and one or more editing actions 1118 for each candidate video of candidate videos 1112 based on the narrative vector 1110 generated by the encoder 1108 and the spatial embedding generated by the spatial embedder 1114. In some instances, the decoder 1116 includes one or more self-attention layers and one or more multilayer perceptron layers. In some instances, the decoder 1116 is configured to predict the editing score and the one or more editing actions 1118 by concatenating the narrative vector 1110 to the spatial embedding to form a concatenated embedding, transforming the concatenated embedding into an intermediate representation using the one or more self-attention layers, and predicting the intermediate representation into the editing score and the one or more editing actions using the one or more multilayer perceptron layers. In some instances, the decoder 1116 can be trained and fine-tuned with one or more corpora of training data 1080 including videos labeled with narrative vectors, spatial embeddings, editing scores, and an editing action. In some instances, the decoder 1116 can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other decoder arrangements are possible.

Figure 12:
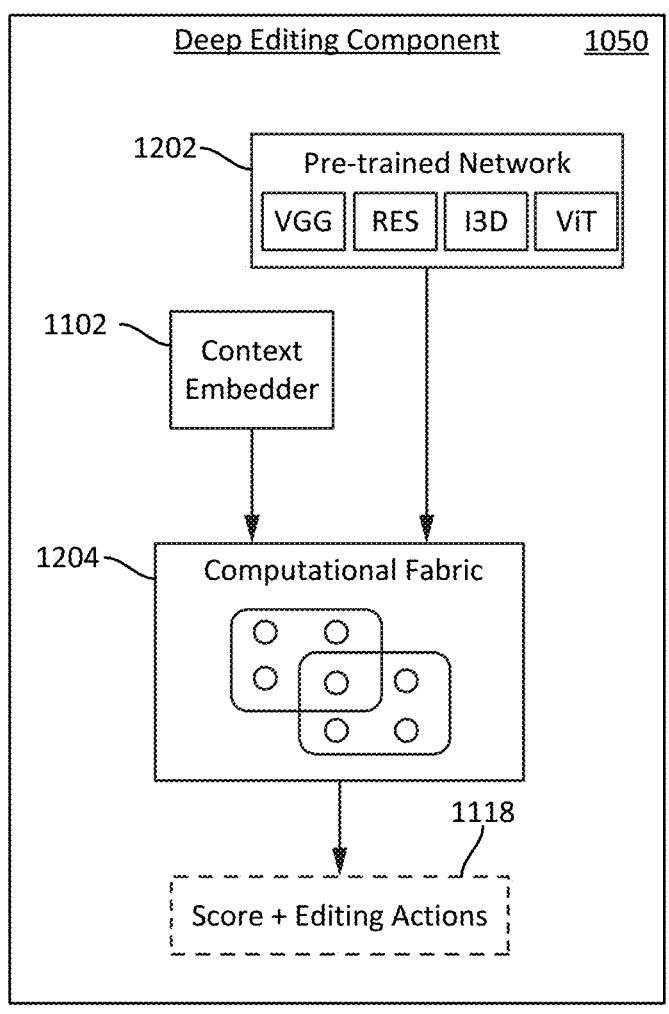
FIG. 12 illustrates another example of a deep editor according to some aspects of the present disclosure.

In some instances, the context of each candidate video of the candidate videos 1112 can be compared to the context of each video segment of the video segments 402 using a machine-learning model including a computational fabric. For example, as shown in FIG. 12, the machine-learning model can include a pre-trained network 1202 that generates context embeddings for the candidate videos 1112, a context embedder such as context embedder 1102 that generates context embeddings for the video segments 402, and a computational fabric 1204 that predicts editing scores and editing actions such as the editing scores and editing actions 1118 for the candidate videos 1112. In some instances, the machine-learning model is configured to determine editing scores and editing actions for the candidate videos 1112 that were captured for a storyboard panel of storyboard panels 410 based on the video segments 402 that were used to generate the storyboard panels 410. In this way, using the machine-learning model, the deep editing component 1050 can determine how well each candidate video captured for a storyboard panel fits into the video generation plan as represented by the respective storyboard panel and editing actions to take if a respective candidate video captured for the respective storyboard panel were to be used in generating the video (to be described later).

The context embedder 1102 is configured to generate context embeddings (e.g., a context vectors and/or a context tokens) that represents the spatial and temporal dependencies of the features of each video segment of the video segments 402 relative to other video segments of video segments 402 that occur before the respective video segment and features of each video segment of video segments 402 relative to other video segments of video segments 402 that occur after the respective video segment. In some instances, the context embedder 1102 is configured to generate a context embedding for a video segment of the video segments 402 using one or more neural networks (e.g., three-dimensional convolutional neural networks, convolutional long short-term memory neural networks, gated recurrent units, transformers). Additional features of the context embedder 1102 have been discussed and are again described herein.

Similarly, the pre-trained network 1202 is configured to generate context embeddings (e.g., a context vectors and/or a context tokens) that represents the spatial and temporal dependencies of the features of each candidate video of the candidate videos 1112 relative to other candidate videos of candidate videos 1112 that occur before the respective candidate video and features of each candidate video of candidate videos 1112 relative to other candidate videos of candidate videos 1112 that occur after the respective candidate video. In some instances, the pre-trained network 1202 is configured to generate a context embedding for a candidate video of the candidate videos 1112 using pre-trained neural networks. In some instances, the pre-trained neural networks include very deep convolutional networks (VGG-Nets), residual networks (ResNets), two-stream inflated three-dimensional convolutional neural networks (I3D), and vision transformers (ViT). The foregoing arrangement is not intended to be limiting and other network arrangements are possible.

The computational fabric 1204 is configured to predict an editing score and one or more editing actions 1118 for each candidate video of candidate videos 1112 based on the context embeddings for the video segments 402 and the context embeddings for the candidate videos 1112. In some instances, the computational fabric 1204 includes convolutional neural networks. In some instances, one or more of the convolutional neural networks may be used for the context embeddings for the video segments 402 and one or more of the convolutional neural networks may be used for the context embeddings for the candidate videos 1112. In some instances, each of the convolutional neural networks include routing paths. In some instances, the computational fabric 1204 is configured to predict the editing score and the one or more editing actions 1118 by activating routing paths in the convolutional neural networks when the video segments 402 and the candidate videos 1112 share a context and deactivating routing paths in the convolutional neural networks when the video segments 402 and the candidate videos 1112 do not share a context. In some instances, when a candidate video of the candidate videos 1112 shares a context with a video segment of the video segments 402 a shared representation can be generated for the respective candidate video and respective video segment and the shared representation can be used to predict the editing score and one or more editing actions 1118. In some instances, the computational fabric 1204 can be trained and fine-tuned with one or more corpora of training data 1080 including videos labeled with narrative vectors, spatial embeddings, editing scores, and an editing action. In some instances, the computational fabric 1204 can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other computational fabric arrangements are possible.

In some instances, videos included in the one or more corpora of training data 1080 can be labeled by human annotators (i.e., manually annotation). In some instances, in order to label the videos, the interface component 316 can be configured to generate one or more graphical user interface pages for annotating training videos. In some instances, a user viewing the one or more graphical user interface pages can view training videos and label them with an editing rating. In some instances, the editing rating can be a positive editing rating representing approval of the editing performed on the training video or a negative editing rating representing disapproval of the editing performed on the training video. In some instances, in order to label the training videos with the editing rating, the user can compare edited videos in the training videos to unedited videos in the training videos and rate the edited videos with an editing rating. In some instances, the training videos can include videos generated by the video generating component 1060 of the machine-learning model. In some instances, the training videos can include videos captured by one or more users of the intelligent creative assistant 300. In some instances, the training videos can include videos acquired from one or more publicly available sources such as publicly available datasets. In this way, the training data 1080 can be collected and updated.

The video generating component 1060 is configured to generate the video using the candidate videos 1070. In some instances, the video generating component 1060 is configured to generate the video by identifying which candidate videos of the candidate videos 1070 should be used to generate the video, editing the identified candidate videos, and combining the edited candidate videos into the video.

In some instances, the video generating component 1060 is configured to identify which candidate videos of the candidate videos 1070 should be used to generate the video by identifying a candidate video of the candidate videos 1070 for each storyboard panel of the storyboard panels 410. In some instances, the video generating component 1060 is configured to identify, for each storyboard panel of the storyboard panels 410, which candidate video among the candidate videos 1112 for the respective storyboard panel should be used to generate the video based on the scores for the candidate videos 1112 for the respective storyboard panel. In some instances, in order to identify the candidate video for a respective storyboard panel, the video generating component 1060 is configured to determine which candidate of the candidate videos 1112 for the respective storyboard panel has the greatest average score. As discussed above, a joint score is determined for each candidate video of the candidate videos 1112 of a respective storyboard panel by the optimization component 1010 and an editing score is determined for each candidate video of the candidate videos 1112 of the respective storyboard panel by the deep editing component 1050. In some instances, the video generating component 1060 is configured to average the joint score and the editing score for each candidate video of the candidate videos 1112 and determine which candidate video of the candidate videos 1112 has the greatest average score. For example, for a storyboard panel having five candidate videos, the video generating component 1060 is configured to determine an average score for each of the five candidate videos and identify the candidate video having the greatest average score among the five candidate videos as the candidate video to be used in generating the video. In this way, the video generating component 1060 is configured to identify a candidate video that should be used to generate the video for each storyboard panel of the storyboard panels 410.

In some instances, once a candidate video has been identified for each storyboard panel of the storyboard panels 410, the video generating component 1060 is configured to trim, edit, and combine the identified candidate videos. In some instances, the video generating component 1060 is configured to trim the identified candidate videos by trimming each of the identified candidate videos based on average trimming positions. As discussed above, joint first and second trimming positions are determined for each candidate video of the candidate videos 1112 for a respective storyboard panel by the optimization component 1010 and first and second trimming positions are determined for each candidate video of the candidate videos 1112 of the respective storyboard panel by the deep editing component 1050. In some instances, the video generating component 1060 is configured to average the joint first trimming position determined by the optimization component 1010 and the first trimming position determined by the deep editing component 1050 to determine an average first trimming position and the joint second trimming position determined by the optimization component 1010 and the second trimming position determined by the deep editing component 1050 to determine an average second trimming position. In some instances, the video generating component 1060 is configured to trim each of the identified candidate videos based on the average first and second trimming positions determined for the respective candidate video. In some instances, in order to trim the respective candidate video based on the average first and second trimming positions, the video generating component 1060 is configured to trim the respective candidate video from the start of the respective candidate video to the average first trimming position and trim the respective candidate video from the end of the respective candidate video to the average second trimming position. In some instances, the video generating component 1060 is configured to trim candidate videos using one or more video editing algorithms.

In some instances, once the candidate videos have been trimmed, the video generating component 1060 is configured to edit and combine the candidate videos. In some instances, the video generating component 1060 is configured to edit each of the candidate videos before combining the candidate videos and/or edit the generated video. In some instances, the video generating component 1060 is configured to edit and combine the candidate videos based on the editing actions predicted for the candidate videos by the deep editing component 1050. In some instances, the video generating component 1060 is configured to edit each of the candidate videos based on the editing actions predicted for the respective candidate video by the deep editing component 1050. In other instances, the video generating component 1060 is configured to edit the generated video based on the editing actions predicted for each of the candidate videos. As discussed above, an editing action represents an action to be taken by the video generating component 1060 in generating the video. In some instances, an editing action includes a cropping action that specifies how a video should be cropped, a blending action that specifies how a video should be blended with another video when being combining the videos, a color correction action that specifies how the colors in a video should be corrected, a contrast correction action that specifies how contrast in a video should be corrected, and a brightness correction action that specifies how brightness in a video should be corrected. The foregoing editing actions are not intended to be limiting and other editing actions may be performed. In some instances, the video generating component 1060 is configured to edit and combine videos using one or more video editing algorithms. In some instances, the length of the generated video can be greater than the length of the inspirational video. In other instances, the length of the generated video be less than the length of the inspirational video.

The editor component 314 can include one or more special-purpose or general-purpose processors. Such special-purpose processors can include processors that are specifically designed to perform the functions of the optimization component 1010, the quality component 1020, the match component 1030, the deep editing component 1050, the video generating component 1060, and other components described herein. Additionally, each of the optimization component 1010, the quality component 1020, the match component 1030, the deep editing component 1050, and the video generating component 1060 can include one or more special-purpose or general-purpose processors that are specifically designed to perform the functions of those components. Such special-purpose processors can be ASICs or FPGAs which are general-purpose components that are physically and electrically configured to perform the functions described herein. Such general-purpose processors may execute special-purpose software that is stored using one or more non-transitory processor-readable mediums, such as RAM, flash memory, a HDD, or a SSD. Further, the functions of the components of the editor component 314 can be implemented using a cloud-computing platform, which is operated by a separate cloud-service provider that executes code and provides storage for clients. In some embodiments, one or more functions of the optimization component 1010, the quality component 1020, the match component 1030, the deep editing component 1050, and the video generating component 1060 can be performed by the storyboard component 310 and/or the director component 312.

In some instances, the interface component 316 is configured to generate one or more graphical user interface pages for presenting generated videos to a user of the intelligent creative assistant 300. In some instances, in response to the viewing the generated videos, the user can rate the generated videos. In some instances, the user can rate the generated videos with a positive rating representing user approval of the generated videos and/or can rate the generated videos with a negative rating representing user disapproval of the generated videos. In some instances, in response to the user rating a generated video with a positive rating, the generated video can be retained, and, in response to the user rating a generated video with a negative rating, the generated video can be discarded. In some instances, a user of a client device configured to display videos can download and view the one or more retained generated videos from a server in communication with the intelligent creative assistant 300. The foregoing presentation of generated videos is not intended to be limiting and other presentations are possible.

In this way, the intelligent creative assistant 300 facilitates generation of a video in accordance with a video generation plan and based on a narrative of an inspirational video. With the intelligent creative assistant 300, participants in a video generation project can produce videos quickly and efficiently without the cost and time involved with traditional methods of video production. Additionally, with the features and techniques described above, creative workflow between and among participants can be improved. As such, participants can focus their attention on the creative aspects of the video production process.

Although not shown, intelligent creative assistant 300 may also include other components such as a processing system, communications circuitry, display circuitry, audio circuitry, orientation detection circuitry, power circuitry, storage devices, and other input and output (I/O) components.

Processing system can be configured to facilitate video generation in accordance with a part or all of the operations and/or methods disclosed herein. The processing system includes one or more processors, one or more memories, and RAM. The one or more processors can read one or more programs (i.e., instructions) from the one or more memories and execute them using RAM. In some embodiments, the one or more programs are configured to facilitate video generation in accordance with a part or all of the operations and/or methods disclosed herein. The one or more processors can be of any type including but not limited to a microprocessor, a microcontroller, a central processing unit (CPU), a graphical processing unit (GPU), a digital signal processor (DSP), an ASIC, a FPGA, or any combination thereof. In some embodiments, the one or more processors can include a plurality of cores, a plurality of arrays, one or more coprocessors, and/or one or more layers of local cache memory.

The one or more memories can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories can include a non-transitory computer-readable storage medium from which the one or more processors can read instructions. A computer-readable storage medium can include electronic, optical, magnetic, or other storage devices capable of providing the one or more processors with computer-readable instructions or other program code. Non-limiting examples of a computer-readable storage medium include magnetic disks, memory chips, read-only (ROM), RAM, an ASIC, a configured processor, optical storage, or any other medium from which a computer processor can read the instructions.

Communications circuitry may be configured to enable the intelligent creative assistant 300 to communicate with and send and receive data and other information over wired or wireless networks and/or wired or wireless channels. Communications circuitry may also be configured to enable the intelligent creative assistant to communicate with, send data and other information to, and receive data and other information from other systems and devices. Examples of communications circuitry include Bluetooth® modules and chips; wireless communication modules and chips; wired communication modules and chips; chips for communicating over local area networks, wide area networks, cellular networks, satellite networks, fiber optic networks, Internet networks, and the like; a system on a chip; Near Field Communication modules and chips; radio frequency identification modules and chips; and/or other circuitry that enables the intelligent creative assistant 300 to send and receive data over a wired or wireless networks and/or communication channels.

Display circuitry may include one or more liquid crystal displays, light emitting diode displays, organic light emitting diode displays, digital light projector displays, liquid crystal on silicon displays, touchscreen displays, and/or other devices that are suitable for presenting images, videos, visualizations, graphics and/or information to one or more users and receiving input from the one or more users.

Audio circuitry may include one or more microphones, speakers, and/or other audio and sound transducer devices that are suitable for recording, processing, storing, and outputting audio and other sounds.

Orientation detection circuitry may include one or more inertial measurement units, accelerometers, gyroscopes, motion sensors, tilt sensors, inclinometers, angular velocity sensors, gravity sensors, magnetometers, compasses, satellite navigation devices such as global positioning system devices, indoor localization devices such as ultra-wideband transmitters and receivers, light detection and ranging localization devices, radio detection and ranging localization devices, wireless fidelity localization devices, microwave localization devices, and Bluetooth® localization devices.

Power circuitry may include batteries, power supplies, charging circuits, solar panels, and/or other devices that can generate power and/or receive power from a source external to the intelligent creative assistant 300 and power the intelligent creative assistant 300 with the generated and/or received generated power.

The removable storage and non-removable storage devices may include magnetic disk devices such as hard disk drives, optical disk drives such as compact disk drives and digital versatile disk drives, solid-state drives, and tape drives.

The input components may include a mouse, a keyboard, a trackball, a touch pad, a touchscreen display, a stylus, a data glove, and the like. Additionally, the output component may include a holographic display, a three-dimensional display, a projector, and the like.

The foregoing description of the intelligent creative assistant 300 is not intended to be limiting and the intelligent creative assistant 300 may include fewer components or additional components than those described above.

Additionally, the foregoing features and techniques have been described with respect to video, but this is not intended to be limiting. The features and techniques described throughout may also be applied to images, animations, audio, audio-visual content, other media, and the like.

FIG. 13 illustrates an example of a process 1300 for facilitating video generation. In some embodiments, process 1300 can be implemented by the intelligent creative assistant 300. In other embodiments, process 1300 can be implemented in software or hardware or any combination thereof.

At block 1302, a first video is identified. In some instances, the first video can be an inspirational video from which a storyboard (i.e., video generation plan) can be generated. The inspirational video can serve as a narrative (e.g., a theme, a story, a creative direction) for a video generation plan for generating a video. In some instances, the inspirational video can be a first length. In some instances, the inspirational video can be uploaded to a server in communication with an intelligent creative assistant such as the intelligent creative assistant 300 by a user of the intelligent creative assistant 300. In some instances, a user can be an individual person, a group of people (e.g., an artistic team), and/or client device (e.g., a mobile phone). In some instances, the user of the intelligent creative assistant can upload to the inspirational video to the server using one or more graphical user interface pages generated by an interface component such as interface component 316 of the intelligent creative assistant 300 (e.g., via an Internet-based portal, an application programming interface, and the like).

At block 1304, the first video is segmented into video segments. In some instances, each video segment can represent certain content of the first video. In some instances, the first video is segmented into video segments using one or more video analysis algorithms. The one or more video analysis algorithms can include video object segmentation algorithms, video instance segmentation algorithms, video semantic segmentation algorithms, video panoptic segmentation algorithms, and the like.

In some instances, the first video can be segmented into video segments with a storyboard component that is configured to generate a storyboard based on a video such as the storyboard component 310 of the intelligent creative assistant 300. In some instances, the storyboard includes storyboard panels which collectively represent the video generation plan.

At block 1306, storyboard panels are automatically generated based on the video segments. In some instances, each storyboard panel of the storyboard panels represents at least one video segment of the video segments. In some instances, the storyboard panels can be generated with a storyboard component that is configured to generate a storyboard based on a video such as the storyboard component 310 of the intelligent creative assistant 300.

In some instances, a storyboard panel can be generated for each video segment of the video segments using a machine-learning model such as the machine-learning model 400. In some instances, the machine-learning model includes a tokenizer for generating sets of tokens from the video segments and a transformer for generating storyboard panels from the sets of tokens.

The tokenizer is configured to generate sets of tokens from the video segments by tokenizing the video segments. In some instances, the tokenizer is configured to tokenize a video segment by dividing the video segment into a matrix of spatial-temporal (i.e., three-dimensional) cubes, generating a token (i.e., embedding) for each spatial-temporal cube of the video segment, and arranging the tokens for the spatial-temporal cubes into a set of tokens for the video segment. In some instances, the token for each spatial-temporal cube can represent the spatial content of each frame of the video segment and context of that spatial content within the video segment. In some instances, the spatial content of each frame of the video segment and the context of the spatial content within the video segment can include features of the video segment including a canonical view (i.e., narrow field-of-view) occurring in the video segment, motion of the image capture device used to capture the video segment, object and/or subject motion occurring in the video segment, object and/or subject pose and orientation occurring in the video segment, actions and/or facial expressions expressed by objects and/or subjects in the video segment, a length of the video segment, and the like.

In some instances, the tokens can represent context of the video segment. In some instances, the context of the video segment includes features depicted in video segments pertaining to portions of the inspirational video that occur prior to and after the portion of the inspirational video from which the video segment is segmented. In some instances, the context of the video segment can include features depicted in all of the video segments that occur prior to and after the portion of the inspirational video from which the video segment is segmented. In some instances, the context of the video segment can include features depicted in some (e.g., three) of the video segments that occur prior to and after the portion of the inspirational video from which the video segment is segmented. In some instances, context can be represented by features depicted by subgroups of video segments within the groups of video segments that occur prior to and after the video segment. In some instances, context can be represented by features depicted by video segments in one subgroup of video segments do not temporally overlap with features depicted by video segments in another subgroup of video segments (i.e., features in each subgroup are temporally independent). For example, context can be represented by non-temporally overlapping object pose and action expression features depicted by the video segments in each subgroup of video segments. In some instances, context can be represented by features depicted by video segments in one subgroup of video segments that temporally overlap with features depicted by video segments in another subgroup of video segments (i.e., some features depicted one subgroup are also depicted in an adjacent subgroup). For example, context can be represented by temporally overlapping object pose and action expression features depicted by the video segments in each subgroup of video segments. In this way, the tokens can represent context of the video segment based on features depicted in the video segment and the temporal relationship between those features and features depicted in video segments occurring prior to and after the video segment.

In some instances, the tokens for the spatial-temporal cubes can be arranged into the set of tokens based on a position of a spatial-temporal cube in the matrix of spatial-temporal cubes. For example, a token for a spatial-temporal cube in the first column and first row of the matrix can be arranged in the set of tokens before a token for a spatial-temporal cube in the first column and second row of the matrix.

In some instances, the tokenizer is configured to generate a token for each spatial-temporal cube of the video segment using one or more neural networks (e.g., convolutional neural networks and/or recurrent neural networks) and/or one or more vector quantized-variational autoencoders. In some instances, the one or more neural networks (e.g., convolutional neural networks and/or recurrent neural networks) and/or one or more vector quantized-variational autoencoders can be trained and fine-tuned with one or more corpora of training data including previously tokenized video segments labeled with a set of tokens. In some instances, the one or more neural networks (e.g., convolutional neural networks and/or recurrent neural networks) and/or one or more vector quantized-variational autoencoders can be trained and fine-tuned using one or more training and fine-tuning techniques such as unsupervised learning, semi-supervised learning, supervised learning, transfer learning, backpropagation, Adam optimization, reinforcement learning, and the like.

The transformer is configured to generate storyboard panels from the sets of tokens. In some instances, the transformer is configured to generate one or more storyboard panels for each set of tokens. In other instances, the transformer is configured to generate one or more storyboard panels for the sets of tokens. The transformer is configured to generate one or more storyboard panels from one or more sets of tokens by mapping the one or more sets of tokens to one or more intermediate representations and mapping the one or more intermediate representations into one or more storyboard panels. In some instances, the transformer can be configured to map the one or more sets of tokens to the one or more intermediate representations and map the one or more intermediate representations into the one or more storyboard panels using one or more encoders and/or decoders. In some instances, the one or more encoders and/or decoders can be applied in parallel, sequentially, and/or hierarchically. In some instances, the one or more encoder and/or decoders can be combined in a shared architecture. In some instances, the transformer can be configured to map the one or more sets of tokens to the one or more intermediate representations (not shown) and map the one or more intermediate representations into the one or more storyboard panels using one or more multi-head self-attention layers and/or one or more feed-forward networks. The foregoing in not intended to be limiting and the transformer can be configured to map the one or more intermediate representations into the one or more storyboard panels using one or more nearest neighbor, subsampling, and sketch generating approaches.

In some instances, the transformer can be trained and fine-tuned with corpora of training data that includes previously generated storyboard panels and the video segments used to generate them. In some instances, the transformer can be trained and fine-tuned using one or more training and fine-tuning techniques such as unsupervised learning, semi-supervised learning, supervised learning, transfer learning, backpropagation, Adam optimization, reinforcement learning, and the like. In some instances, the transformer can be trained and fine-tuned using a masked modeling technique in which the transformer learns to reconstruct the training data based on batches of masked training data (e.g., video segments with masked patches and/or frames). In some instances, the tokenizer and the transformer can be trained and fine-tuned sequentially and/or concurrently.

In some instances, in order to train the transformer, features of frames of a video segment included in the training data are extracted into a feature space, the feature space is encoded into a latent space, the latent space is reconstructed into a reconstructed space, video frames are generated from the reconstructed space, and losses representing differences between the video frames and frames of the video segment are calculated. In some instances, in order to train the transformer, an optimization algorithm can find a minima of one or more loss functions, the losses can be calculated based on the minima using the one or more loss functions, and one or more weights of the transformer can be determined and set based on the losses. In some instances, the features of the frames of the video segment include style features, composition features, expression features, pose features, action features, and the like. In some instances, the features of the frames of the video segment can include one or more residual features. In some instances, the one or more residual features includes features of the frames of the video segment not included in features. In some instances, the loss is a perceptual loss that represents differences between high level features (e.g., style discrepancies) between the video frames and frames of the video segment. In some instances, the loss is a discriminative loss that represents differences between content objects (e.g., main subjects) in the frames of the video segment and the same content objects (e.g., the same main subjects) in the video frames. In some instances, the loss is a feature loss that represents the differences between the feature space and the reconstructed space. In some instances, the loss is a content loss that represents the differences between content in the frames of the video segment and content in the video frames. The foregoing arrangements are not intended to be limiting and other transformer training arrangements are possible.

In some instances, the storyboard panels can be presented to a user such as a user of the intelligent creative assistant 300. In some instances, an interface component of the intelligent creative assistant can be configured to generate one or more graphical user interface pages for presenting the storyboard panels. In some instances, each storyboard panel can be presented with one or more first textual labels representing the contents of the video segment used to generate the respective storyboard panel. In some instances, the one or more first textual labels can be descriptive of the contents of the video segment used to generate the respective storyboard panel.

At block 1308, video attributes are automatically determined. In some instances, each video attribute of the corresponds to a storyboard panel of the storyboard panels. In some instances, the video attributes can be generated with a director component that is configured to determine video attributes based on video segments such as the director component 312 of the intelligent creative assistant 300. In some instances, the video attributes represent desired attributes of the video to be generated. In some instances, the director component can be configured to determine one or more video attributes for each storyboard panel based on the video segment used to generate the respective storyboard panel.

In some instances, a video attribute can be a scale of an object or subject depicted in a video segment. The scale of an object or subject refers to the size of the object or subject depicted in the video segment compared to the size of other features depicted in the video segment. In some instances, when the scale of the object or subject depicted in the video segment is greater than a first predetermined scale threshold (i.e., the object or subject is larger than other features depicted in the video segment), a close-range video attribute can be determined for the storyboard panel corresponding to the video segment (i.e., the video attribute indicating that the object or subject appeared as if it was close to the image capturing device when the video segment was captured). In some instances, the first predetermined scale threshold is 50%. Other percentages are possible. For example, the first predetermined scale threshold can be set between 50%-70%). In some instances, when the scale of the object of subject depicted in the video segment is less than a second predetermined scale threshold (i.e., the object or subject is smaller than other features depicted in the video segment), the far-range video attribute can be determined for the storyboard panel corresponding to the video segment (i.e., the video attribute indicating that the object or subject appeared as if it was far from the image capturing device when the video segment was captured). In some instances, the second predetermined scale threshold is 25%. Other percentages are possible. For example, the second predetermined threshold can be set between 20-30%. In some instances, when the scale of the object or subject is between the second predetermined scale threshold and the first predetermined scale threshold (i.e., the object or subject is larger than some features and smaller than some features depicted in the video segment), a middle-range video attribute can be determined for the storyboard panel corresponding to the video segment (i.e., the video attribute indicating that the object or subject appeared as if it is not close to or far from the image captured device when the video segment was captured).

In some instances, a video attribute can be a motion of an object or subject depicted in a video segment. The motion of an object or subject refers to the motion of the object or subject depicted in the video segment compared to the motion of other features depicted in the video segment. In some instances, when the object or subject depicted in the video segment moves in a direction away from and to the left of other features depicted in the video segment, a pan right video attribute can be determined for the storyboard panel corresponding to the video segment (i.e., the video attribute indicating that the object, subject, or image capturing device is moving to the left relative to other features depicted in the video segment). Similarly, in some instances, when the object or subject depicted in the video segment moves in a direction away from and to the right of other features depicted in the video segment, a pan left video attribute can be determined for the storyboard panel corresponding to the video segment (i.e., the video attribute indicating that the object, subject, or image capturing device is moving to the right relative to other features depicted in the video segment). In some instances, when the object or subject depicted in the video segment is not moving, a static video attribute can be determined for the storyboard panel corresponding to the video segment (i.e., the video attribute indicating that the object, subject, or image capturing device is not moving relative to other features depicted in the video segment).

The director component is configured to determine video attributes for the storyboard panels based on the video segments using a machine-learning model such as machine-learning model 700. In some instances, the machine-learning model includes a feature extractor for extracting feature vectors from the video segments, a scale attribute classifier for classifying the extracted feature vectors with scale video attributes, and a motion attribute classifier for classifying the extracted feature vectors with motion video attributes. In some instances, the feature extractor is configured to extract feature vectors from the video segments using one or more image processing algorithms. In some instances, the one or more image processing algorithms include object/subject detection algorithms, pose detection algorithms, motion detection/optical flow algorithms, and the like. In some instances, the scale attribute classifier is configured to classify each video segment with one of the close-range, middle-range, or far-range video attributes included in the class of scale video attributes based on the features of the object or subject depicted in the video segment as represented by the feature vectors extracted for the video segment. Similarly, in some instances, the motion attribute classifier is configured to classify each video segment with one of the static, pan left, or pan right video attributes included in the class of motion video attributes based on the feature vectors extracted for the video segment. In some instances, the scale attribute classifier and the motion attribute classifier can include one or more neural networks. In some instances, the scale attribute classifier and the motion attribute classifier can be perceptron, naive bayes, decision tree, logistic regression, k-nearest neighbor, random forest, and/or support vector machine-type classifiers. In some instances, the one or more neural networks can be pre-trained to classify video attributes. In some instances, the scale attribute classifier can be trained and fine-tuned with video segments depicting objects or subjects at different scales and including one or more labels characterizing the respective scales of the objects or subjects depicted in the video segments. Similarly, in some instances, the motion attribute classifier can be trained and fine-tuned with video segments depicting objects or subjects exhibiting different motion and including one or more labels characterizing the respective motion exhibited by the objects or subjects. In some instances, the scale attribute classifier and the motion attribute classifier can be trained and fine-tuned using one or more training and fine-tuning techniques such as unsupervised learning, semi-supervised learning, supervised learning, transfer learning, backpropagation, Adam optimization, reinforcement learning, and the like.

In some instances, each storyboard panel can also be presented with one or more second textual labels representing the video attributes for a respective storyboard panel. In some instances, the one or more second textual labels can be descriptive of the video attributes determined for the respective storyboard panel. In some instances, the one or more second textual labels can be modified based on an input received by the intelligent creative assistant 300 from the user of the intelligent creative assistant 300. In some instances, based on the input received by the intelligent creative assistant 300 from the user of the intelligent creative assistant 300, a second textual label with a storyboard panel can be removed, added, and/or changed to another second textual label.

At block 1310, second videos are identified. In some instances, each second video corresponds to at least one video attribute of the video attributes. In some instances, users of the intelligent creative assistant 300 can view the storyboard panels along with textual labels describing the contents of the video segments used to generate the storyboard panels and textual labels describing the video attributes determined for the storyboard panels, gain insight into the video generation plan for generating the video, and capture one or more second videos (i.e., candidate videos) for each of the storyboard panels. In some instances, a first user can capture one or more candidate videos for a storyboard panel of the storyboard panels and a second user can capture one or more candidate videos for another storyboard panel for the storyboard panels. In some instances, the first and second users can capture one or more candidate videos for each storyboard panel of the storyboard panels. In some instances, a user can be an individual person, a group of people (e.g., an artistic team), and/or client device (e.g., a mobile phone). In some instances, each of the candidate videos can be uploaded to a server in communication with the intelligent creative assistant 300 by the user of the intelligent creative assistant 300. In some instances, the user of the intelligent creative assistant 300 can upload candidate videos to the server using one or more graphical user interface pages generated by the intelligent creative assistant 300 (e.g., via an Internet-based portal, an application programming interface, and the like).

At block 1312, an editing score is determined for each second video of the second videos. In some instances, the editing score represents how well a respective candidate video of the candidate videos fit into the video generation plan as represented by the storyboard panels. In some instances, the editing scores represent how well candidate videos captured for a storyboard panel fit into the video generation plan as represented by the respective storyboard panel.

In some instances, the editing score can be determined with a deep editing component that is configured to determine editing scores and editing actions for candidate videos such as deep editing component 1050 of the intelligent creative assistant 300. In some instances, the deep editing component can be part of an editor component that is configured to generate the video of the video generation plan based on the candidate videos such as the editor component 314 of the intelligent creative assistant.

In some instances, the editing actions represent actions to be taken by a video generating component that is configured to generate video such as video generating component 1060. In some instances, the video generating component can be part of the editor component. In some instances, editing actions include, but are not limited to, a trimming action that specifies first and second trimming positions for the candidate videos, a cropping action that specifies how candidate videos should be cropped, a blending action that specifies how the trimmed candidate videos should be combined to generate the video, a color correction action that specifies how the colors in the candidate videos should be corrected, a contrast correction action that specifies how contrast in the candidate videos should be corrected, and a brightness correction action that specifies how brightness in the candidate videos should be corrected.

In some instances, the deep editing component is configured to determine editing scores and editing actions for the candidate videos using a machine-learning model. In some instances, the machine-learning model can include a context embedder that generates a context embedding for the video segments, a spatial embedder that generates a spatial embedding for a video segment, an encoder that generates a narrative vector based on the context embedding and spatial embedding, a spatial embedder that generates spatial embeddings for candidate videos, and a decoder that predicts editing scores and editing actions for the candidate videos. In some instances, the video segment is a video segment of video segments. In some instances, the candidate videos are candidate videos of the candidate videos that were captured for a respective storyboard panel of the storyboard panels. In some instances, the machine-learning model is configured to determine editing scores and editing actions for the candidate videos that were captured for a storyboard panel of storyboard panels based on the video segment of video segments that was used to generate the respective storyboard panel and the video segments that were used to generate the storyboard panel. In this way, using the machine-learning model, the deep editing component can determine how well each candidate video captured for a storyboard panel fits into the video generation plan as represented by the respective storyboard panel and editing actions to take if a respective candidate video captured for the respective storyboard panel were to be used in generating the video.

The context embedder is configured to generate a context embedding (e.g., a context vector and/or a context token) that represents the spatial and temporal dependencies of the features of the video segment relative to the video segments of video segments that occur before the video segment and features of the video segment relative to the video segments of video segments that occur after the video segment. In some instances, the context embedder is configured to generate a context embedding for a video segment of the video segments using one or more neural networks (e.g., three-dimensional convolutional neural networks, convolutional long short-term memory neural networks, gated recurrent units, transformers). In some instances, the one or more neural networks can be pre-trained to generate context embeddings for videos. In some instances, the one or more neural networks can be trained and fine-tuned with one or more corpora of training data including videos labeled with context embeddings. In some instances, the one or more neural networks can be trained and fine-tuned using one or more training and fine-tuning techniques such as unsupervised learning, semi-supervised learning, supervised learning, transfer learning, backpropagation, Adam optimization, reinforcement learning, and the like.

The spatial embedder is configured to generate a spatial embedding (e.g., a spatial vector and/or a spatial token) that represents the spatial features of the video segment. In some instances, the spatial embedder is configured to generate a spatial embedding using one or more neural networks (e.g., a convolutional neural network). In some instances, the one or more neural networks can be pre-trained to generate spatial embeddings for videos. In some instances, the one or more neural networks can be trained and fine-tuned with one or more corpora of training data 1080 including videos labeled with spatial embeddings. In some instances, the one or more neural networks can be trained and fine-tuned using one or more training and fine-tuning techniques such as unsupervised learning, semi-supervised learning, supervised learning, transfer learning, transfer learning, backpropagation, Adam optimization, reinforcement learning, and the like.

The encoder is configured to generate a narrative vector based on the context embedding generated by the context embedder and the spatial embedding generated by the spatial embedder. In some instances, the encoder includes one or more self-attention layers and one or more multilayer perceptron layers. In some instances, the encoder is configured to generate a narrative vector by concatenating the context embedding to the spatial embedding to form a concatenated embedding, transforming the concatenated embedding into an intermediate representation using the one or more self-attention layers, and predicting the intermediate representation into the narrative vector using the one or more multilayer perceptron layers. In some instances, the encoder can be trained and fine-tuned with one or more corpora of training data including videos labeled with context embeddings, spatial embeddings, and narrative vectors. In some instances, the encoder can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other encoder arrangements are possible.

The spatial embedder is configured to generate a spatial embedding (e.g., a spatial vector and/or a spatial token) for each candidate video of candidate videos that represents the spatial features of each candidate video of candidate videos. In some instances, the spatial embedder is configured to generate a spatial embedding using the one or more neural networks (e.g., a convolutional neural network). In some instances, the one or more neural networks can be pre-trained to generate spatial embeddings for videos. In some instances, the one or more neural networks can be trained and fine-tuned with one or more corpora of training data including videos labeled with spatial embeddings. In some instances, the one or more neural networks can be trained and fine-tuned using one or more training and fine-tuning techniques such as unsupervised learning, semi-supervised learning, supervised learning, transfer learning, backpropagation, Adam optimization, reinforcement learning, and the like.

The decoder is configured to predict an editing score and one or more editing actions for each candidate video of candidate videos based on the narrative vector generated by the encoder and the spatial embedding generated by the spatial embedder. In some instances, the decoder includes one or more self-attention layers and one or more multilayer perceptron layers. In some instances, the decoder is configured to predict the editing score and the one or more editing actions by concatenating the narrative vector to the spatial embedding to form a concatenated embedding, transforming the concatenated embedding into an intermediate representation using the one or more self-attention layers, and predicting the intermediate representation into the editing score and the one or more editing actions using the one or more multilayer perceptron layers. In some instances, the decoder can be trained and fine-tuned with one or more corpora of training data including videos labeled with narrative vectors, spatial embeddings, editing scores, and an editing action. In some instances, the decoder can be trained and fine-tuned using one or more training and fine-tuning techniques such as unsupervised learning, semi-supervised learning, supervised learning, transfer learning, backpropagation, Adam optimization, reinforcement learning, and the like.

In some instances, the context of each candidate video of the candidate videos can be compared to the context of each video segment of the video segments using a machine-learning model including a computational fabric. The machine-learning model can include a pre-trained network that generates context embeddings for the candidate videos, a context embedder that generates context embeddings for the video segments, and a computational fabric that predicts editing scores and editing actions such as the editing scores and editing actions for the candidate videos. In some instances, the machine-learning model is configured to determine editing scores and editing actions for the candidate videos that were captured for a storyboard panel of storyboard panels based on the video segments that were used to generate the storyboard panels. In this way, using the machine-learning model, the deep editing component can determine how well each candidate video captured for a storyboard panel fits into the video generation plan as represented by the respective storyboard panel and editing actions to take if a respective candidate video captured for the respective storyboard panel were to be used in generating the video.

The context embedder is configured to generate context embeddings (e.g., a context vectors and/or a context tokens) that represents the spatial and temporal dependencies of the features of each video segment of the video segments relative to other video segments of video segments that occur before the respective video segment and features of each video segment of video segments relative to other video segments of video segments that occur after the respective video segment. In some instances, the context embedder is configured to generate a context embedding for a video segment of the video segments using one or more neural networks (e.g., three-dimensional convolutional neural networks, convolutional long short-term memory neural networks, gated recurrent units, transformers). Additional features of the context embedder have been discussed and are again described herein.

Similarly, the pre-trained network is configured to generate context embeddings (e.g., a context vectors and/or a context tokens) that represents the spatial and temporal dependencies of the features of each candidate video of the candidate videos relative to other candidate videos of candidate videos that occur before the respective candidate video and features of each candidate video of candidate videos relative to other candidate videos of candidate videos that occur after the respective candidate video. In some instances, the pre-trained network is configured to generate a context embedding for a candidate video of the candidate videos using pre-trained neural networks. In some instances, the pre-trained neural networks include very deep convolutional networks (VGGNets), residual networks (ResNets), two-stream inflated three-dimensional convolutional neural networks (I3D), and vision transformers (ViT).

The computational fabric is configured to predict an editing score and one or more editing actions for each candidate video of candidate videos based on the context embeddings for the video segments and the context embeddings for the candidate videos. In some instances, the computational fabric includes convolutional neural networks. In some instances, one or more of the convolutional neural networks may be used for the context embeddings for the video segments and one or more of the convolutional neural networks may be used for the context embeddings for the candidate videos. In some instances, each of the convolutional neural networks include routing paths. In some instances, the computational fabric is configured to predict the editing score and the one or more editing actions by activating routing paths in the convolutional neural networks when the video segments and the candidate videos share a context and deactivating routing paths in the convolutional neural networks when the video segments and the candidate videos do not share a context. In some instances, when a candidate video of the candidate videos shares a context with a video segment of the video segments a shared representation can be generated for the respective candidate video and respective video segment and the shared representation can be used to predict the editing score and one or more editing actions. In some instances, the computational fabric can be trained and fine-tuned with one or more corpora of training data including videos labeled with narrative vectors, spatial embeddings, editing scores, and an editing action. In some instances, the computational fabric can be trained and fine-tuned using one or more training and fine-tuning techniques such as unsupervised learning, semi-supervised learning, supervised learning, transfer learning, backpropagation, Adam optimization, reinforcement learning, and the like. The foregoing arrangements are not intended to be limiting and other computational fabric arrangements are possible.

In some instances, videos included in the one or more corpora of training data can be labeled by human annotators (i.e., manually annotation). In some instances, in order to label the videos, the interface component can be configured to generate one or more graphical user interface pages for annotating training videos. In some instances, a user viewing the one or more graphical user interface pages can view training videos and label them with an editing rating. In some instances, the editing rating can be a positive editing rating representing approval of the editing performed on the training video or a negative editing rating representing disapproval of the editing performed on the training video. In some instances, in order to label the training videos with the editing rating, the user can compare edited videos in the training videos to unedited videos in the training videos and rate the edited videos with an editing rating. In some instances, the training videos can include videos generated by the video generating component of the machine-learning model. In some instances, the training videos can include videos captured by one or more users of the intelligent creative assistant. In some instances, the training videos can include videos acquired from one or more publicly available sources such as publicly available datasets. In this way, training data can be collected and updated.

At block 1314, each second video of the second videos is edited based on the editing score determined for the respective second video; and, at block 1316, the edited second videos are combined to generate a third video.

In some instances, the second videos can be edited based on the editing scores determined for the second videos and the edited second videos can be combined to generate a third video by a video generating component that is configured to generate video such as video generating component 1060. In some instances, the video generating component is configured to generate the third video by identifying which candidate videos should be used to generate the third video, editing the identified second videos, and combining the edited candidate videos into the third video.

In some instances, the video generating component 1060 is configured to identify which second videos (i.e., candidate videos) of candidate videos should be used to generate the third video (i.e., video) by identifying a candidate video of the candidate videos for each storyboard panel of the storyboard panels. In some instances, the video generating component is configured to identify, for each storyboard panel of the storyboard panels, which candidate video among the candidate videos for the respective storyboard panel should be used to generate the video based on the scores for the candidate videos for the respective storyboard panel. In some instances, in order to identify the candidate video for a respective storyboard panel, the video generating component is configured to determine which candidate of the candidate videos 1112 for the respective storyboard panel has the greatest average score. In some instances, the video generating component is configured to average a joint score and the editing score for each candidate video of the candidate videos and determine which candidate video of the candidate videos has the greatest average score. For example, for a storyboard panel having five candidate videos, the video generating component is configured to determine an average score for each of the five candidate videos and identify the candidate video having the greatest average score among the five candidate videos as the candidate video to be used in generating the video.

In some instances, the editor component is configured to generate the video of the video generation plan based on the candidate videos. The editor component is configured to generate the video of the video generation plan based on the candidate videos using a machine-learning model such as the machine-learning model 1000. In some instances, the machine-learning model is configured to receive the candidate videos, receive the video segments, identify which candidate video of the candidate videos for each storyboard panel of the storyboard panels should be used to generate the video, and generate the video based on the identified candidate videos for the storyboard panels. In some instances, the machine-learning model includes an optimization component, the deep editing component discussed above, and the video generating component discussed above.

The optimization component includes a quality component and a match component. The quality component includes a quality meter that is configured to determine quality metrics for the candidate videos and a quality scorer that is configured to determine quality scores and trimming positions for the candidate videos. The quality meter is configured to determine quality metrics for each candidate video of the candidate videos. In some instances, the quality meter is configured to determine quality metrics for each candidate video of the candidate videos by calculating a jitter metric, a blur metric, and a contrast metric for each frame of the respective candidate video and averaging the jitter metric, the blur metric, and the contrast metric calculated for the respective frame. The jitter metric represents unintentional image capturing device movements that occurred when a candidate video was captured. In some instances, the jitter metric can be calculated using one or more jitter, camera shake, motion detection, optical flow algorithms, and the like. The blur metric represents a degree to which features (e.g., foreground and background objects) in the candidate video are in focus (i.e., the degree to which a portion of the candidate video contains high frequency components with sharp extended edges). In some instances, the blur metric can be calculated using one or more auto-focusing, focus detection, motion blur, motion detection, optical flow algorithms, and the like. The contrast metric represents differences in color and luminance between objects, subjects, regions, and features in the candidate video. In some instances, the contrast metric can be calculated based on root mean square (i.e., standard deviation of the filtered response).

The quality scorer is configured to determine a quality score and trimming positions for each candidate video of the candidate videos. In some instances, the quality scorer is configured to determine a quality score and trimming positions for each candidate video of the candidate videos by applying a boxcar function to the quality metrics determined for the respective candidate video. In some instances, the quality score can be determined by averaging the quality metrics for the frames of the respective candidate video within a start of a peak of the boxcar function and an end of the peak of the boxcar function. In some instances, the quality score can be normalized such that the normalized quality score falls in a range between zero and one with zero representing that the respective candidate video is of the lowest quality and one representing that the respective candidate video of the highest quality. In some instances, the trimming positions include a first trimming position that indicates that a portion of the respective candidate video located between the start of the respective candidate video and the first trimming position should be trimmed when generating the video and a second trimming position that indicates that a portion of the respective candidate video between the end of the respective candidate video and the second trimming position should be trimmed when generating the video.

The match component includes a feature extractor that is configured to extract features from the video segments and the candidate videos and a match scorer that is configured to determine match scores and trimming positions for the candidate videos. The feature extractor is configured to extract features from each video segment of the video segments and each candidate video of the candidate videos. In some instances, the feature extractor is configured to extract features from each video segment of the video segments and each candidate video of the candidate videos by using a feature extractor such as the feature extractor of the director component. In some instances, the feature extractor is configured to extract features from each video segment of the video segments and each candidate video of the candidate videos by using one or more image processing algorithms and/or natural language processing algorithms. In some instances, the image processing algorithms include object/subject detection algorithms, pose detection algorithms, motion detection/optical flow algorithms, and the like. In some instances, the one or more natural language processing algorithms can include speech detection algorithms, speech recognition algorithms, and the like.

The match scorer is configured to determine a match score and trimming positions for each candidate video of the candidate videos. In some instances, the match scorer is configured to determine a match score for each candidate video of the candidate videos by determining the similarity between the features extracted from the respective candidate video and the features extracted from a video segment corresponding to the respective candidate video. In some instances, the video segment corresponding to the respective candidate video is the video segment used to generate the storyboard panel of the storyboard panels in which the respective candidate video was captured for. The similarity between the features extracted from the respective candidate video and the features extracted from a video segment corresponding to the respective candidate video can be determined using a similarity measure. In some instances, the similarity can fall in a range between zero and one with zero representing no similarity between the respective candidate video and the corresponding video segment and one representing a maximum similarity between the respective candidate video and the corresponding video segment.

In some instances, the match scorer is configured to determine trimming positions for each candidate video of the candidate videos by dividing the respective candidate video and corresponding video segment into groups of frames and comparing the similarity between features extracted from the respective groups of frames. In some instances, the trimming positions can be determined based on the group of frames among the groups of frames in the respective candidate video that is most similar to a corresponding group of frames among the groups of frames in the corresponding video segment. In some instances, a first trimming position that indicates that a portion of the respective candidate video located between the start of the respective candidate video and the first trimming position should be trimmed when generating the video can be set at the start of the group of frames determined to be most similar and a second trimming position that indicates that a portion of the respective candidate video between the end of the respective candidate video and the second trimming position should be trimmed when generating the video can be set at the end of the group of frames determined to be most similar.

The optimization component is configured to determine joint scores for the candidate videos based on quality scores for the candidate videos and the match scores for the candidate videos. In some instances, the optimization component is configured to determine a joint score for each candidate video of the candidate videos based on the quality score for respective candidate video and the match score for the respective candidate video. In some instances, the optimization component is configured to determine a joint score for each candidate video of the candidate videos by combing the quality score for respective candidate video and the match score for the respective candidate video. In some instances, the optimization component is configured to combine the quality score for respective candidate video and the match score for the respective candidate video by adding the quality score for respective candidate video and the match score for the respective candidate video. In some instances, the optimization component is configured to combine the quality score for respective candidate video and the match score for the respective candidate video by averaging the quality score for respective candidate video and the match score for the respective candidate video. In some instances, the quality score for respective candidate video and the match score for the respective candidate video can be added or averaged by weighting the quality score and the match score for the respective candidate video and adding or averaging the weighted quality score and the weighted match score for respective candidate video. In some instances, the weight given to the quality score is greater than the weight given to the match score. In some instances, the weights given to the quality score and the match score can be set by a user of the intelligent creative assistant.

Similarly, in some instances, the optimization component is configured to determine joint trimming positions for each candidate video of the candidate videos based on the trimming positions determined by the quality scorer and match scorer for the candidate videos. In some instances, the optimization component is configured to determine joint trimming positions for each candidate video of the candidate videos by averaging the first trimming positions determined by the quality scorer and the match scorer for the respective candidate video and the second trimming positions determined by quality scorer and the match scorer for the respective candidate video.

In some instances, once a candidate video has been identified for each storyboard panel of the storyboard panels, the video generating component is configured to trim, edit, and combine the identified candidate videos. In some instances, the video generating component is configured to trim the identified candidate videos by trimming each of the identified candidate videos based on average trimming positions. As discussed above, joint first and second trimming positions are determined for each candidate video of the candidate videos for a respective storyboard panel by the optimization component and first and second trimming positions are determined for each candidate video of the candidate videos of the respective storyboard panel by the deep editing component. In some instances, the video generating component is configured to average the joint first trimming position determined by the optimization component and the first trimming position determined by the deep editing component to determine an average first trimming position and the joint second trimming position determined by the optimization component and the second trimming position determined by the deep editing component to determine an average second trimming position. In some instances, the video generating component is configured to trim each of the identified candidate videos based on the average first and second trimming positions determined for the respective candidate video. In some instances, in order to trim the respective candidate video based on the average first and second trimming positions, the video generating component is configured to trim the respective candidate video from the start of the respective candidate video to the average first trimming position and trim the respective candidate video from the end of the respective candidate video to the average second trimming position. In some instances, the video generating component is configured to trim candidate videos using one or more video editing algorithms.

In some instances, once the candidate videos have been trimmed, the video generating component is configured to edit and combine the candidate videos. In some instances, the video generating component is configured to edit each of the candidate videos before combining the candidate videos and/or edit the generated video. In some instances, the video generating component is configured to edit and combine the candidate videos based on the editing actions predicted for the candidate videos by the deep editing component. In some instances, the video generating component is configured to edit each of the candidate videos based on the editing actions predicted for the respective candidate video by the deep editing component. In other instances, the video generating component is configured to edit the generated video based on the editing actions predicted for each of the candidate videos. As discussed above, an editing action represents an action to be taken by the video generating component in generating the video. In some instances, an editing action includes a cropping action that specifies how a video should be cropped, a blending action that specifies how a video should be blended with another video when being combining the videos, a color correction action that specifies how the colors in a video should be corrected, a contrast correction action that specifies how contrast in a video should be corrected, and a brightness correction action that specifies how brightness in a video should be corrected. The foregoing editing actions are not intended to be limiting and other editing actions may be performed. In some instances, the video generating component is configured to edit and combine videos using one or more video editing algorithms. In some instances, the length of the generated video can be greater than the length of the inspirational video. In other instances, the length of the generated video be less than the length of the inspirational video.

At block 1318, the third video is output. In some instances, the third video (i.e., generated videos) can be presented to a user such as user of the intelligent creative assistant 300. In some instances, in response to the viewing the generated videos, the user can rate the generated videos. In some instances, the user can rate the generated videos with a positive rating representing user approval of the generated videos and/or can rate the generated videos with a negative rating representing user disapproval of the generated videos. In some instances, in response to the user rating a generated video with a positive rating, the generated video can be retained, and, in response to the user rating a generated video with a negative rating, the generated video can be discarded. In some instances, a user of a client device configured to display videos can download and view the one or more retained generated videos from a server in communication with the intelligent creative assistant 300.

In this way, the intelligent creative assistant 300 facilitates generation of a video in accordance with a video generation plan and based on a narrative of an inspirational video. With the intelligent creative assistant 300, participants in a video generation project can produce videos quickly and efficiently without the cost and time involved with traditional methods of video production. Additionally, with the features and techniques described above, creative workflow between and among participants can be improved. As such, participants can focus their attention on the creative aspects of the video production process.

The foregoing features and techniques have been described with respect to video, but this is not intended to be limiting. The features and techniques described throughout may also be applied to images, animations, audio, audio-visual content, other media, and the like.

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method for facilitating video generation, the method comprising:
   identifying a first video;
   segmenting the first video into a plurality of video segments;
   automatically generating a plurality of storyboard panels based on the plurality of video segments using a machine-learning model, each storyboard panel of the plurality of storyboard panels representing at least one video segment of the plurality of video segments;
   automatically determining a plurality of video attributes by processing each video segment of the plurality of video segments, each video attribute of the plurality of video attributes corresponding to a storyboard panel of the plurality of storyboard panels;
   identifying a plurality of second videos, each second video of the plurality of second videos corresponding to at least one video attribute of the plurality of video attributes;
   determining a plurality of editing scores or a plurality of editing actions for the plurality of second videos by processing the plurality of second videos using another machine-learning model; and
   editing the plurality of second videos based on the plurality of editing scores or the plurality of editing actions;
   combining the second videos to generate a third video; and
   outputting the third video.

2. The method of claim 1, wherein each storyboard panel of the plurality of storyboard panels includes a textual label describing at least one of content depicted in a video segment of the plurality of video segments and a video attribute of the plurality of video attributes.

3. The method of claim 1, wherein the plurality of video attributes is automatically determined.

4. The method of claim 1, wherein the plurality of editing scores or the plurality of editing actions includes
   the plurality of editing scores.

5. The method of claim 4, wherein the other machine-learning model used to determine the plurality of editing scores or the plurality of editing actions includes an encoder and decoder, a computational fabric, or a combination thereof.

6. The method of claim 1, wherein the plurality of editing scores or the plurality of editing actions includes
   the plurality of editing actions.

7. The method of claim 6, wherein the other machine-learning model used to determine the plurality of editing actions includes an encoder and decoder, a computational fabric, or a combination thereof.

8. A system for facilitating video generation comprising: one or more processors; and one or more memories, the one or more memories storing instructions which, when executed by the one or more processors, cause the one or more processors to perform operations comprising:

identifying a first video;

segmenting the first video into a plurality of video segments;

automatically generating a plurality of storyboard panels based on the plurality of video segments using a machine-learning model, each storyboard panel of the plurality of storyboard panels representing at least one video segment of the plurality of video segments;

automatically determining a plurality of video attributes by processing each video segment of the plurality of video segments, each video attribute of the plurality of video attributes corresponding to a storyboard panel of the plurality of storyboard panels;

identifying a plurality of second videos, each second video of the plurality of second videos corresponding to at least one video attribute of the plurality of video attributes;

determining a plurality of editing scores or a plurality of editing actions for the plurality of second videos by processing the plurality of second videos using another machine-learning model; and editing the plurality of second videos based on the plurality of editing scores or the plurality of editing actions;

combining the second videos to generate a third video; and outputting the third video.

9. The system of claim 8, wherein each storyboard panel of the plurality of storyboard panels includes a textual label describing at least one of content depicted in a video segment of the plurality of video segments and a video attribute of the plurality of video attributes.

10. The system of claim 8, wherein the plurality of video attributes is automatically determined.

11. The system of claim 8, wherein the plurality of editing scores or the plurality of editing actions includes the plurality of editing scores.

12. The system of claim 11, wherein the other machine-learning model used to determine the plurality of editing scores or the plurality of editing actions includes an encoder and decoder, a computational fabric, or a combination thereof.

13. The system of claim 8, wherein the plurality of editing scores or the plurality of editing actions includes the plurality of editing actions.

14. The system of claim 13, wherein the other machine-learning model used to determine the plurality of editing actions or the plurality of editing actions includes an encoder and decoder, a computational fabric, or a combination thereof.

15. One or more non-transitory computer-readable media storing computer-readable instructions that, when executed by one or more processors, cause the one or more processors to perform operations including:

identifying a first video;

segmenting the first video into a plurality of video segments;

automatically generating a plurality of storyboard panels based on the plurality of video segments using a machine-learning model, each storyboard panel of the plurality of storyboard panels representing at least one video segment of the plurality of video segments;

automatically determining a plurality of video attributes by processing each video segment of the plurality of video segments, each video attribute of the plurality of video attributes corresponding to a storyboard panel of the plurality of storyboard panels;

identifying a plurality of second videos, each second video of the plurality of second videos corresponding to at least one video attribute of the plurality of video attributes;

determining a plurality of editing scores or a plurality of editing actions for the plurality of second videos by processing the plurality of second videos using another machine-learning model; and editing the plurality of second videos based on the plurality of editing scores or the plurality of editing actions;

combining the second videos to generate a third video; and outputting the third video.

16. The one or more non-transitory computer-readable media of claim 15, wherein each storyboard panel of the plurality of storyboard panels includes a textual label describing at least one of content depicted in a video segment of the plurality of video segments and a video attribute of the plurality of video attributes.

17. The one or more non-transitory computer-readable media of claim 15, wherein the plurality of video attributes is automatically determined using the other machine-learning model.

18. The one or more non-transitory computer-readable media of claim 15, wherein the plurality of editing scores or the plurality of editing actions includes the plurality of editing scores.

19. The one or more non-transitory computer-readable media of claim 18, wherein the plurality of editing scores or the plurality of editing actions includes the plurality of editing actions.

20. The one or more non-transitory computer-readable media of claim 19, wherein the other machine-learning model used to determine the plurality of editing scores and used to determine the plurality of editing actions includes an encoder and decoder, a computational fabric, or a combination thereof.

* * * * *